United States Patent
Takamiya et al.

[11] Patent Number: 6,005,667
[45] Date of Patent: Dec. 21, 1999

[54] OPTICAL DISPLACEMENT MEASUREMENT APPARATUS AND INFORMATION RECORDING APPARATUS

[75] Inventors: Makoto Takamiya, Tokyo; Kou Ishizuka, Ohmiya, both of Japan

[73] Assignee: Canon Kabushiki Kaisha, Tokyo, Japan

[21] Appl. No.: 08/897,548

[22] Filed: Jul. 21, 1997

[30] Foreign Application Priority Data

Jul. 23, 1996 [JP] Japan .................................. 8-193317
Aug. 30, 1996 [JP] Japan .................................. 8-248804

[51] Int. Cl.$^6$ .................................................. G01B 9/02
[52] U.S. Cl. ........................................ 356/356; 356/363
[58] Field of Search ................................. 356/356, 363; 250/237

[56] References Cited

U.S. PATENT DOCUMENTS

| | | | |
|---|---|---|---|
| 4,658,132 | 4/1987 | Nishiura et al. | 250/237 G |
| 4,766,310 | 8/1988 | Michel | 250/237 |
| 4,902,133 | 2/1990 | Tojo et al. | 356/356 |

FOREIGN PATENT DOCUMENTS

| | | |
|---|---|---|
| 62-121314 | 6/1987 | Japan . |
| 3-279812 | 11/1991 | Japan . |

*Primary Examiner*—Frank G. Font
*Assistant Examiner*—Tu T. Nguyen
*Attorney, Agent, or Firm*—Fitzpatrick, Cella, Harper & Scinto

[57] ABSTRACT

This invention relates to an apparatus for optically measuring the relative displacement of an object with a diffraction grating, and the apparatus has a light projection system for spot-projecting a light beam onto the diffraction grating and light detection means for receiving an interference light beam obtained by multiplexing diffracted light beams of different orders from the spot projection position on the diffraction grating in a state in which the wavefronts of the diffracted light beams are matched with each other. The relative displacement of the object is measured upon light reception of the light detection means.

24 Claims, 16 Drawing Sheets

AZIMUTH ANGLE: $\eta$

ROTATIONAL ANGLE: $\phi$

OPTICAL DISPLACEMENT MEASUREMENT APPARATUS AND INFORMATION RECORDING APPARATUS

BACKGROUND OF THE INVENTION

1. Field of the Invention

The present invention relates to an optical displacement measurement apparatus and an information recording apparatus. More particularly, the present invention can be suitably applied to an encoder that utilizes modulation of an interference light beam owing to diffraction and interference that occur upon the irradiation of light onto an object, and a recording apparatus such as a hard disk that uses the encoder.

2. Related Background Art

As conventional apparatuses for obtaining various physical quantities such as movement, displacement, and the like of an object with high precision by irradiating light onto the object, for example, an optical encoder, a laser Doppler velocimeter, a laser interferometer, and the like are used. The features of these apparatuses using light are high precision and high resolution, and a further size reduction is now required of them for use in a broader application range.

As examples of such apparatuses, a compact encoder that uses three diffraction gratings, as disclosed in Japanese Patent Application Laid-Open No. 62-121314, an apparatus which is obtained by simultaneously realizing a size reduction of such devices with high precision in a simple way, as disclosed in Japanese Patent Application Laid-Open No. 3-279812, and the like are known.

A conventional encoder has high precision, but the following problems remain unsolved.

In the apparatuses disclosed in these references, the optical path of light emitted from a light-emitting source is split into two or more paths, the split light beams are irradiated on a movable diffraction grating, and interference light of diffracted light beams obtained based on these split light beams is received by a photoelectric conversion element. In such an arrangement, if light beams multiplexed by a multiplexing diffraction grating to be brought to interference with each other have a tilt therebetween, fringes are produced on the light-receiving surface of the photoelectric conversion element. In this case, in changes over time in intensity of interference light, the individual interference regions on the light-receiving surface have different phases in the presence of these fringes.

Accordingly, any tilt between the light beams to be multiplexed must be strictly prevented, and the interference states of all the interference regions on the light-receiving surface must be equally adjusted to a constant state. However, it is very difficult to adjust equally the interference states of the interference light beams multiplexed by the diffraction grating to a constant state in all the interference regions. Especially, as the main body resolution is improved, the interference state varies more easily due to any attachment errors, and the like.

Such interference state variations lower the amplitude of a signal detected by averaging changes over time in intensity of the interference light on the light-receiving surface upon production of interference fringes, resulting in an unstable signal amplitude. On the other hand, in an apparatus in which, for example, a multiplexing diffraction grating is made up of a plurality of diffraction gratings with different phases, and interference light components that leave these gratings are individually detected to obtain A- and B-phase signals, if multiplexed light beams have a tilt therebetween, the phase difference between signals obtained from different interference regions is not stable. Also, the amplitudes of signals detected from the individual interference regions are unstable.

Taking the apparatus described in Japanese Patent Application Laid-Open No. 3-279812 as an example, interference state variations owing to attachment errors of a head unit and a scale unit respectively provided with a projection means and a light-receiving means, are problematical. If attachment errors that produce rotation about an axis perpendicular to the formation surface of a diffraction grating have occurred, interference fringes parallel to the arrangement direction of the diffraction grating are formed. On the other hand, if attachment errors that produce rotation about an axis perpendicular to the arrangement direction of the diffraction grating have occurred in the formation surface of the diffraction grating, interference fringes parallel to this rotation axis direction are formed. In the following description, the rotational angle of rotational attachment errors about the axis perpendicular to the surface formed with the diffraction grating will be referred to as an "azimuth angle ($\eta$)", and the rotational angle of rotational attachment errors about the axis perpendicular to the arrangement direction of the diffraction grating in the formation surface of the diffraction grating will be referred to as a "rotational angle ($\phi$)".

When collimated light beams are used as two light beams to be brought to interference, even when attachment errors in the rotational angle direction have occurred, the two interference light beams have a small angle deviation as long as the errors are small. However, if deviations have occurred extremely in the rotational angle direction, the interference state becomes unstable. On the other hand, when attachment errors in the azimuth angle direction have occurred even slightly, the two interference light beams have a large angle deviation, and the interference state becomes unstable sensitively.

SUMMARY OF THE INVENTION

The present invention has been made in consideration of the above-mentioned conventional arts, and has as its object to provide an apparatus which can prevent interference fringes from being formed due to attachment errors in principle, and can accurately execute displacement measurements independently of the attachment state of a diffraction grating or the detection side.

Other objects of the present invention will become apparent from the following description of the embodiments.

DETAILED DESCRIPTION OF THE PREFERRED EMBODIMENTS

Figure 1:
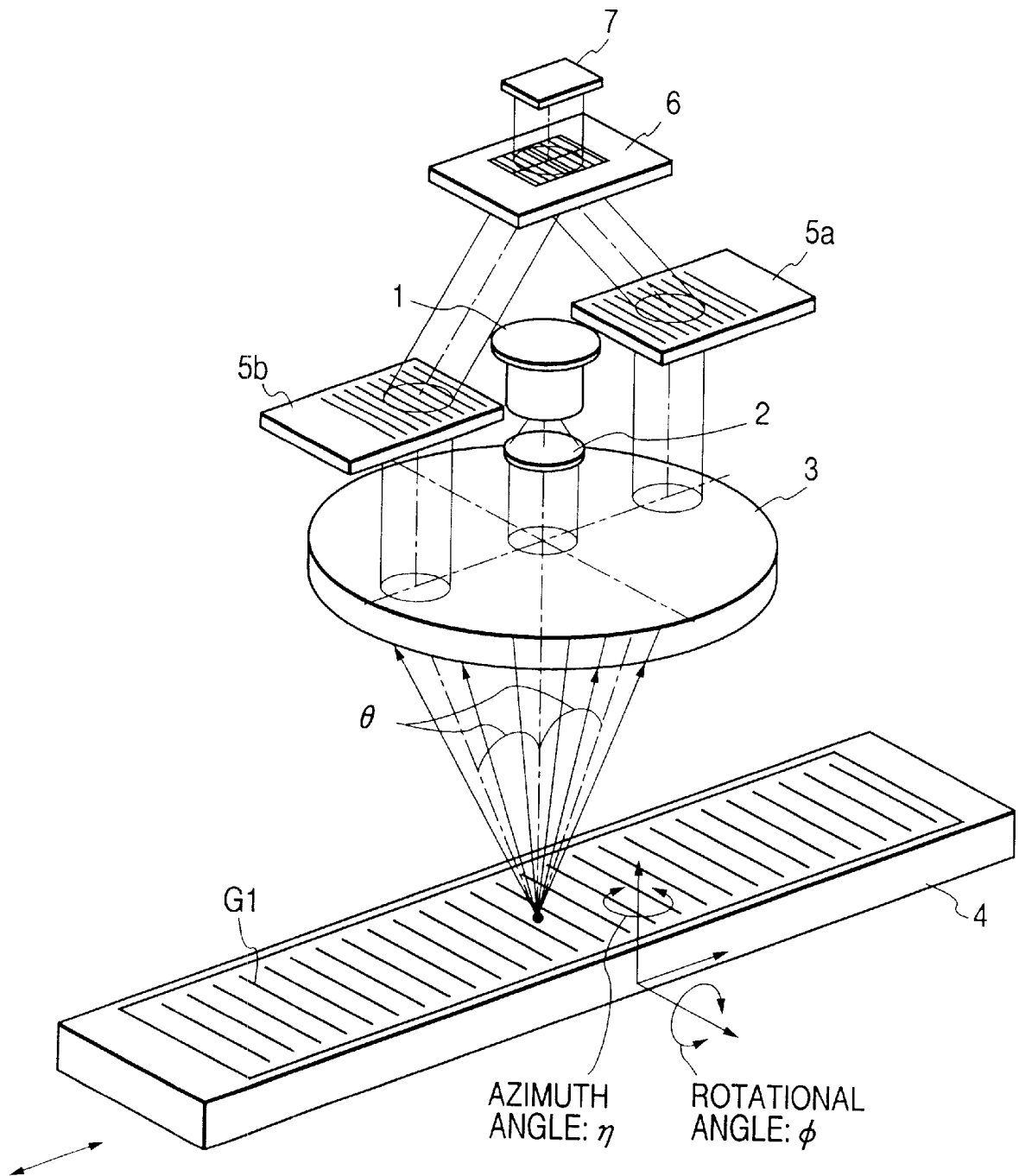
FIG. 1 is a schematic perspective view for explaining the first embodiment of the present invention.

FIG. 1 is a schematic perspective view showing the optical arrangement of an optical displacement measurement apparatus according to the first embodiment of the present invention.

Referring to FIG. 1, the apparatus includes a laser diode 1, a collimator lens 2, and an objective lens 3. A scale 4 is arranged at the moving object side, and is provided with a diffraction grating G1. The apparatus also includes blazed diffraction gratings 5a and 5b, a beam multiplexing diffraction grating 6 having four grating regions with grating phases shifted by $\lambda/4$ each, and a four-split sensor 7 having four light-receiving regions corresponding to the four grating regions of the diffraction grating 6.

A divergent light beam emitted from the laser diode 1 is converted into a collimated light beam by the collimator lens 2, and is irradiated as a spot onto the diffraction grating G1 by the lens 3 whose distance from the diffraction grating G1 on the scale 4 is adjusted to a focal point position f. The diffraction grating G1 has a phase diffraction grating which has a grating height substantially equal to the ¼ of the wavelength, so as to reflect and diffract ±first-order diffracted light beams especially strongly. If $\lambda$ represents the laser wavelength and a represents the diameter of the laser collimated light beam, a beam waist $\omega 1$ on the diffraction grating G1 is given by:

$$\omega 1 = 1.273 \times \lambda \times |f|/a$$

The diameter a of the laser collimated light beam and the focal point position f are selected with respect to the grating pitch p of the diffraction grating G1 so that the beam waist $\omega 1$ on the diffraction grating G1 corresponds to at least several grating lines.

The light beam irradiated onto the diffraction grating G1 is reflected and diffracted to output ±first-order diffracted light.

The diffraction angle $\theta$ of the ±first-order diffracted light at that time is obtained from the following equation:

$$p \sin \theta = \lambda$$

The ±first-order diffracted light is transmitted through the lens whose distance from the diffraction grating G1 is adjusted to the focal point position f again, and is converted into two collimated light beams having optical axes parallel to each other. This optical system can realize an optical system in which both ±first-order diffracted light beams are collimated light beams and have optical axes parallel to each other even when the scale rotates along the grating formation surface.

The two collimated light beams are deflected by the equal-pitch blazed diffraction gratings 5a and 5b which are arranged to deflect light beams in the optical axis direction of the entire optical system, and are multiplexed with their wavefronts being matched with each other, by the diffraction grating 6, which is arranged at the crossing position of the deflected light beams, has a pitch equal to those of the blazed diffraction gratings 5a and 5b, and has four grating regions with grating phases shifted by $\lambda/4$ each in the two-beam transmission region.

The light beams multiplexed by the four grating regions are received by the 4-split sensor 7 which has the light-receiving regions at the receiving positions of these light beams. The 4-split sensor 7 outputs four sine wave signals with phase differences of ¼ of a period from the individual light-receiving regions upon movement of the scale 4. These four signals are processed by a signal processing system (not shown) to obtain information as to the moving amount and direction of the scale 4. Such signal processing is known to those who are skilled in the art, and a detailed description thereof will be omitted.

In such optical system for multiplexing two collimated light beams with their wavefronts being matched with each other, when two diffraction gratings are arranged per light beam, and portions having different grating arrangement phases are formed within the light transmission region of one of the two diffraction gratings, phase difference signals can be generated without using any complicated optical arrangement such as a combination of, e.g., a quarter-wave plate and a deflection prism, and high-precision detection is attained by a simple arrangement.

A case will be examined below wherein the scale 4 has been rotated in the azimuth angle direction in this embodiment.

Figure 2:
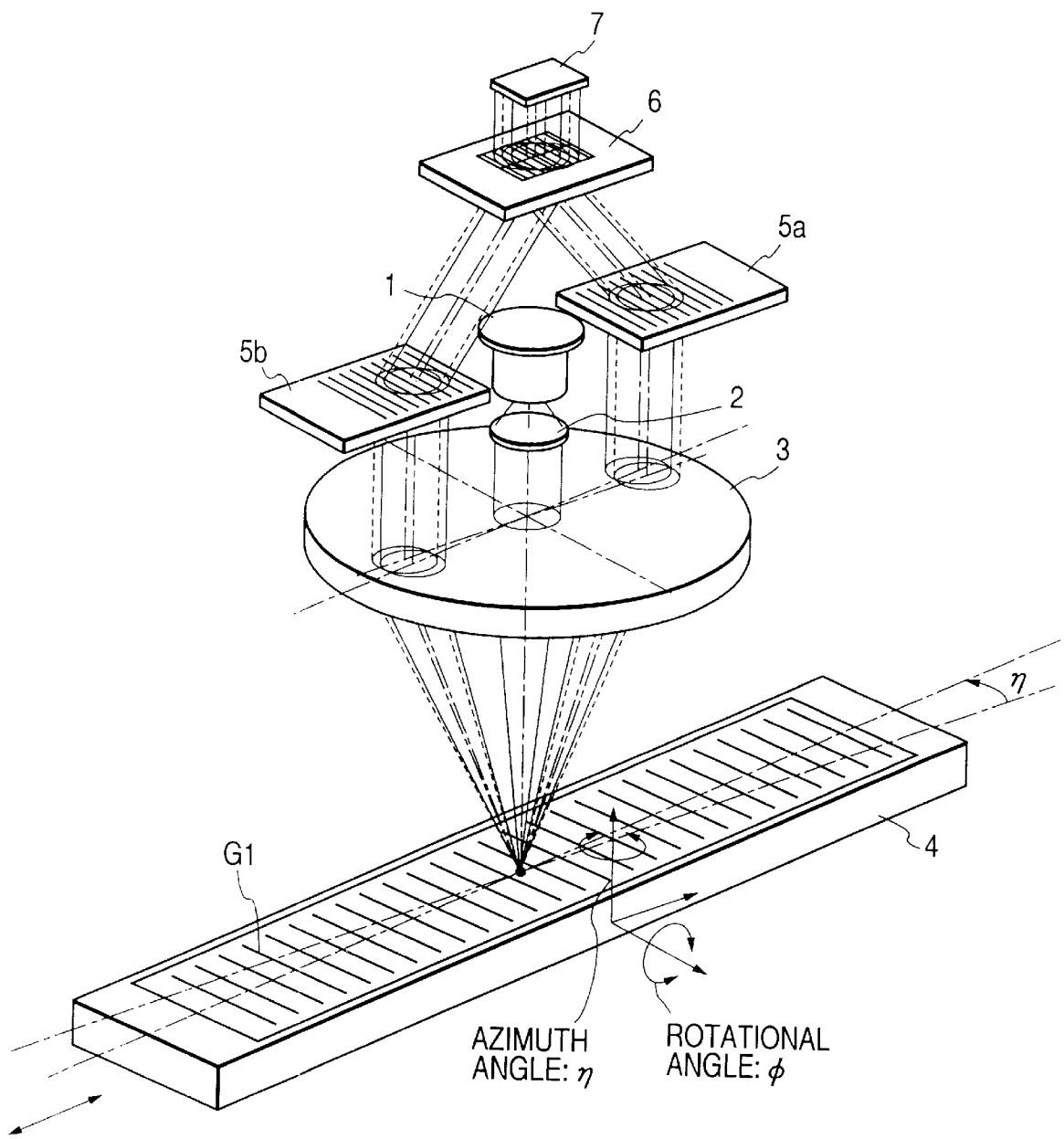
FIG. 2 is a perspective view showing the optical path when a scale is rotated in the azimuth angle direction.

FIG. 2 shows the optical path when the scale 4 suffers attachment errors in the azimuth angle direction.

As can be seen from FIG. 2, when the scale 4 suffers attachment errors of the azimuth angle $\eta$, ±first-order diffracted light beams respectively shift in the azimuth angle direction from the state free from any attachment errors (dotted lines), and emerge from the diffraction grating as diverging beams.

The two divergent light beams are transmitted through and deflected by the lens 3. In this case, the two divergent light beams always become two collimated light beams with parallel optical axes independently of the azimuth angle $\eta$ since the diffraction grating G1 is adjusted to the focal point position of the lens 3. In this manner, even when the two light beams are multiplexed by the blazed diffraction gratings 5a and 5b and the diffraction grating 6, the optical axes of the two light beams remain parallel to each other although a small positional shift is produced between the two light beams. In other words, the two multiplexed light beams have no angle deviation independently of the value of the azimuth angle $\eta$ of attachment errors, and no spatial interference fringes are formed on the light-receiving surface of the 4-split sensor 7.

Figure 3:
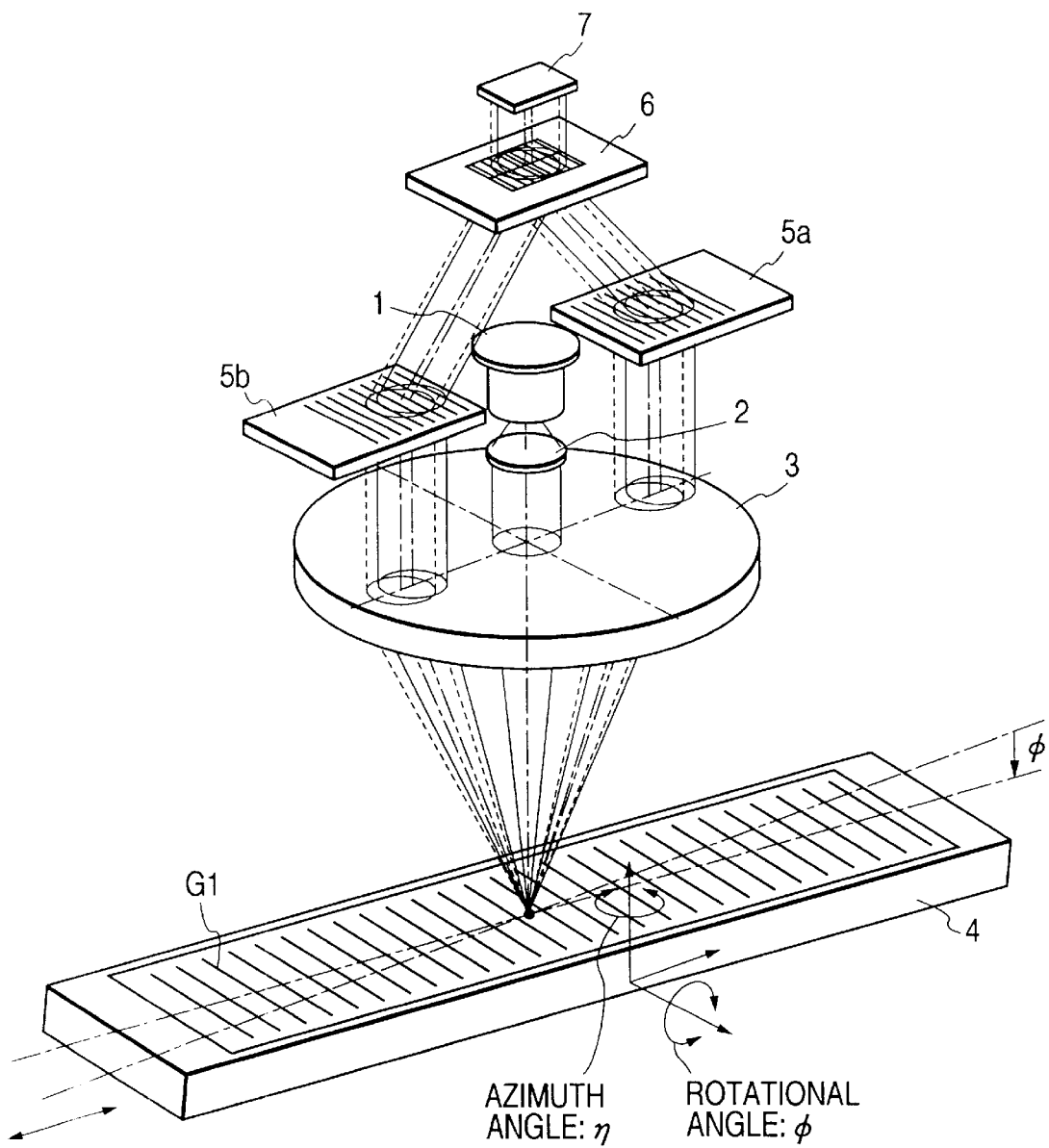
FIG. 3 is a perspective view showing the optical path when the scale is rotated in the rotational angle direction.

FIG. 3 shows the optical path when the scale 4 suffers attachment errors in the rotational angle direction.

As can be seen from FIG. 3, when the scale 4 suffers attachment errors of the rotational angle $\phi$, ±first-order diffracted light beams respectively make different angles with the optical axis of the lens 3 (apparent diffraction angles). The apparent diffraction angles $\theta \pm 2\phi$ are obtained by:

$$p(\sin \theta \pm \sin \phi) = \lambda$$

These ±first-order diffracted light beams with different apparent diffraction angles shift from the state free from any attachment errors (dotted lines) in the rotational angle direction, and emerge from the diffraction grating as diverging beams.

These two divergent light beams are transmitted through and deflected by the lens 3. In this case, the two divergent light beams always become two collimated light beams with parallel optical axes independently of the rotational angle φ since the diffraction grating G1 is adjusted for the focal point position of the lens 3. In this manner, even when the two light beams are multiplexed by the blazed diffraction gratings 5a and 5b and the diffraction grating 6, the optical axes of the two light beams remain parallel to each other although a small positional shift is produced between the two light beams. In other words, the two multiplexed light beams have no angle deviation independently of the value of the rotational angle φ of attachment errors, and no spatial interference fringes are formed on the light-receiving surface of the 4-split sensor 7.

With the above-mentioned arrangement, an optical displacement measurement apparatus that can be used regardless of the attachment precision of the scale can be provided.

As has been described above with the aid of FIGS. 2 and 3, when scale attachment errors have occurred, the optical paths of the two multiplexed light beams are slightly translated, but the diameter of the incident light beam, grating pitch, and lens focal length can be selected in correspondence with expected scale attachment errors in the design process, so that the two light beam finally reach the four regions of the light detector. In this manner, an optical displacement measurement apparatus that can cope with every condition can be realized.

When the azimuth angle is produced, measurement errors corresponding to sin η are superposed on the finally obtained displacement information. In this case, the scale range, scale pitch, and the like can be selected so that such errors caused by the expected scale attachment errors do not have any adverse influences.

The first embodiment has exemplified, as a projection optical system that projects light onto the diffraction grating, the arrangement in which a collimated light beam is irradiated onto the objective lens 3 as a lens system adjusted to the focal point position, and is then irradiated as a spot onto the diffraction grating G1. Alternatively, the objective lens 3 may be separately arranged on the projection side and the light-receiving side, and light may be directly irradiated as a spot onto the diffraction grating G1 without using any lens adjusted to the focal point position, thus obtaining the same effect as described above. In this case, since the beam waist on the diffraction grating G1 is determined by the projection optical system, the number of grating lines to be irradiated can be set with a high degree of freedom with respect to the grating pitch p of the diffraction grating G1.

On the other hand, the first embodiment has exemplified, as a deflection optical system for multiplexing two collimated light beams with their wavefronts being matched with each other, the arrangement in which two diffraction gratings are arranged per light beam. Alternatively, a deflection optical system which has a prism system and multiplexes light beams with their wavefronts being matched with each other may be adopted.

Furthermore, after the diffraction grating 6 is constituted by a single grating, and the 4-split sensor 7 is replaced by a sensor with a single light-receiving surface, the positions of the set of the laser diode 1 and the collimator lens 2, and the sensor 7 may be reversed, thus also realizing an optical displacement measurement apparatus which can be used regardless of attachment precision of the scale.

This apparatus will be described below. Two collimated light beams split by the diffraction grating 6 form beam waists on the diffraction grating G1 via the blazed diffraction gratings 5a and 5b, and the lens 3, and ±first-order diffracted light beams produced here in a direction normal to the diffraction grating formation surface in the multiplexed state are converted into collimated light beams by the lens 3 and then enter the sensor. As in the first embodiment, after the ±first-order diffracted light beams are converted into collimated light beams by the lens 3, they undergo translations alone but do not produce any angle deviation even when attachment errors have occurred in the azimuth angle direction or rotational angle direction.

Figure 4:
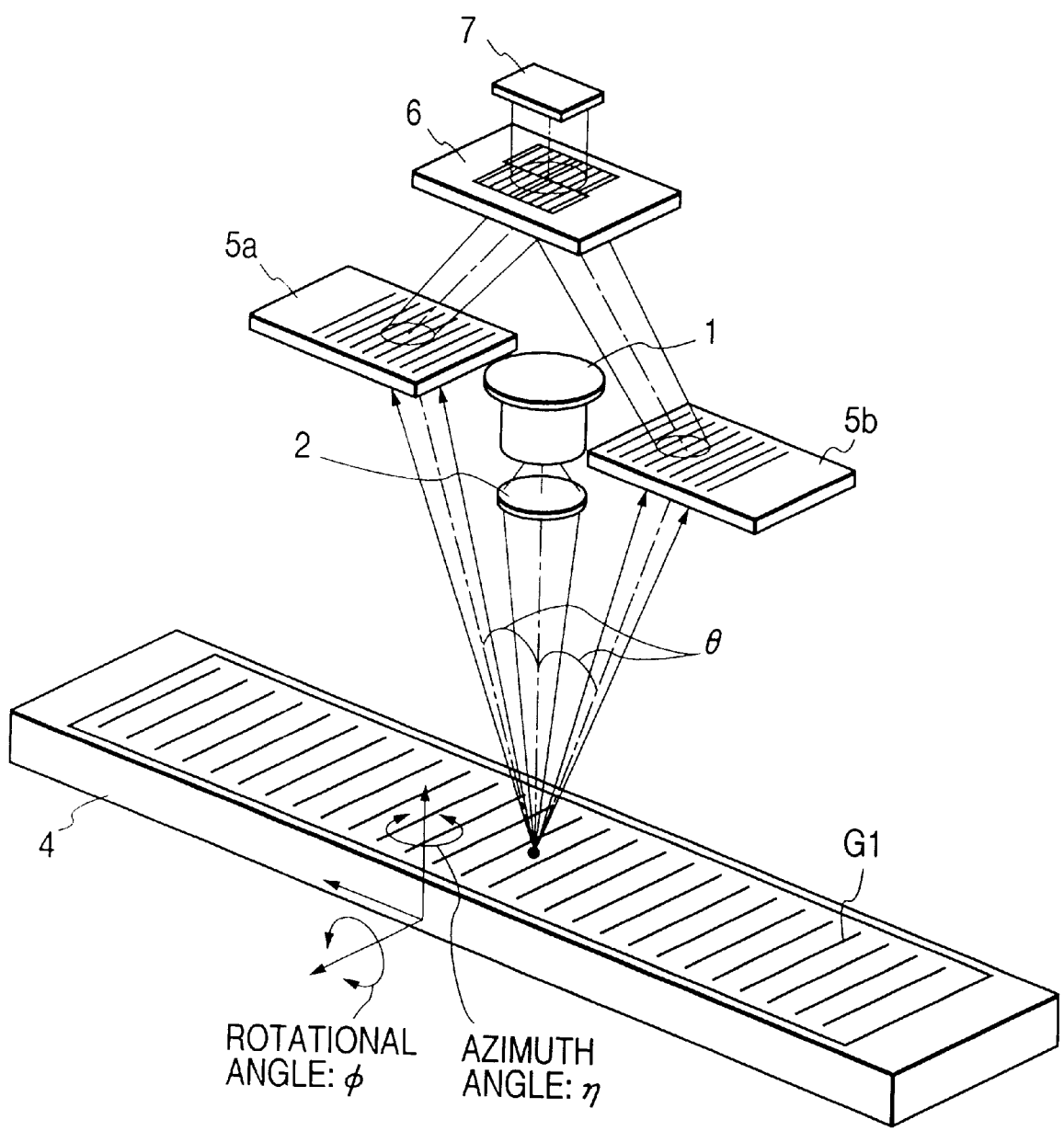
FIG. 4 is a schematic perspective view for explaining another embodiment of the present invention.

FIG. 4 is a schematic perspective view showing the optical arrangement of an optical displacement measurement apparatus according to another embodiment of the present invention.

The same reference numerals in FIG. 4 denote the same parts as in the first embodiment, and a detailed description thereof will be omitted.

A light beam, which is focused by the lens 2 and is irradiated as a spot onto the diffraction grating G1, is reflected and diffracted to produce ±first-order diffracted light beams.

At this time, the diffraction angle θ the ±first-order diffracted light beams make with the optical axis is obtained by the following equation as in the first embodiment:

$$p1 \sin \theta = \lambda$$

where p1 is the grating pitch of the diffraction grating G1.

The ±first-order diffracted light beams are deflected by the blazed diffraction gratings 5a and 5b which are arranged to deflect these light beams in the optical axis direction of the entire optical system and have a grating pitch p2, and are multiplexed with their wavefronts being matched with each other, by the diffraction grating 6, which has a grating pitch p3, and has four grating regions with grating phases shifted by λ/4 each in the two-beam transmission region.

Thereafter, the 4-split sensor 7 corresponding to the four grating regions outputs sine wave signals with phase differences of a ¼ period upon movement of the scale 4, as in the first embodiment.

At this time, the grating pitches p1, p2, and p3 of the three diffraction gratings satisfy:

$$1/p2 = 1/p1 + 1/p3$$

When the diffraction grating interval is set so that the diffraction grating 6 adjusts the optical axes of two diffracted light beams, the centers of curvature of the wavefronts of two diffracted light beams output from the diffraction grating 6 can be identical with each other. In this manner, a deflection optical system that finally multiplexes two diffracted light beams with their wavefronts matched with each other is realized.

Figure 5:
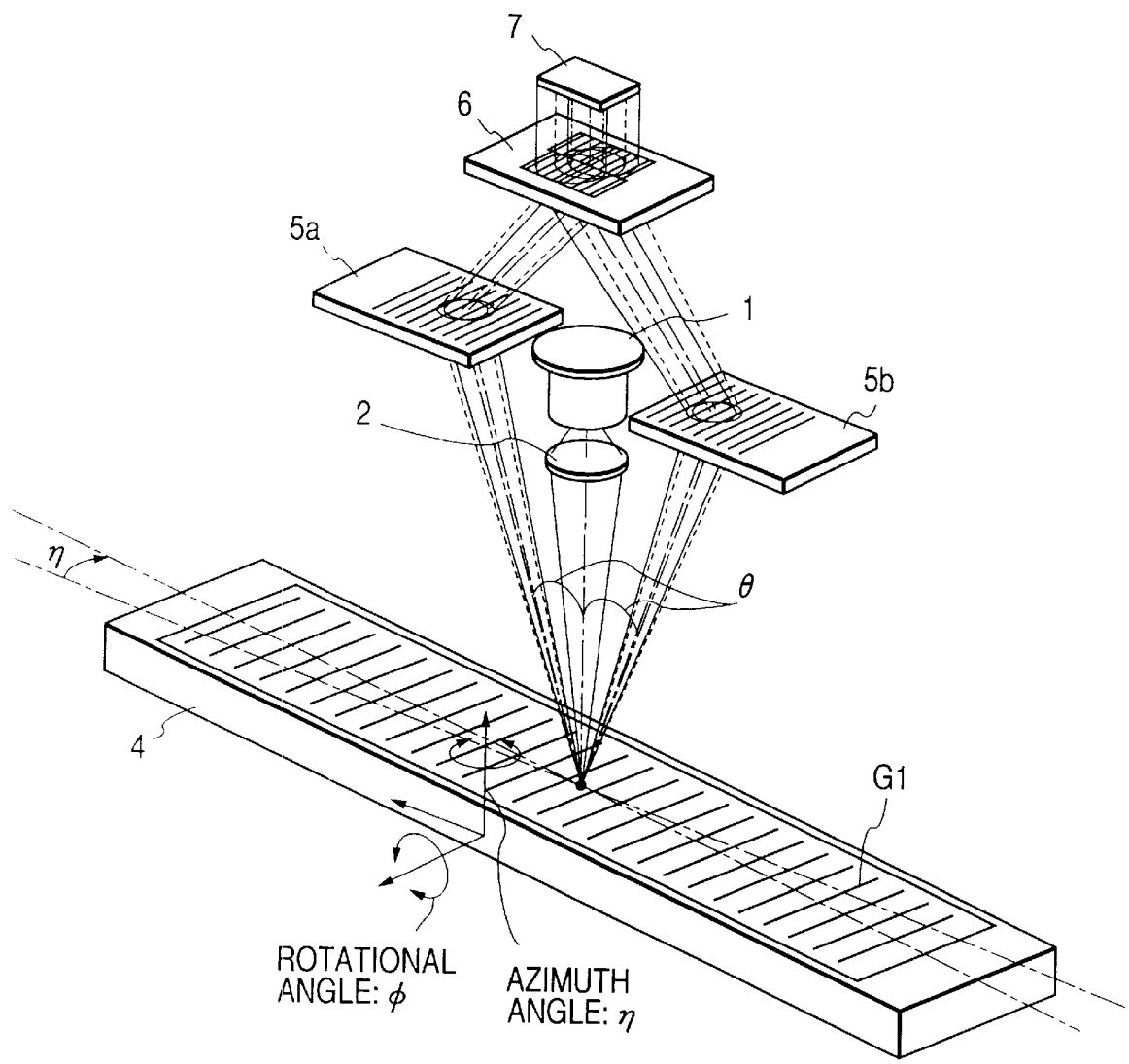
FIG. 5 is a perspective view showing the optical path when a scale is rotated in the azimuth angle direction.

FIG. 5 shows the optical path when the scale 4 suffers attachment errors in the azimuth angle direction.

As can be seen from FIG. 5, when the scale 4 suffers attachment errors of the azimuth angle η, ±first-order diffracted light beams respectively shift in the azimuth angle direction from the state free from any attachment errors (dotted lines), and emerge from the diffraction grating as diverging beams.

The two divergent light beams still have wavefronts having the irradiation point on the diffraction grating as their centers of curvature independently of the azimuth angle η, since the diffraction grating G1 is adjusted for the beam focusing position of the lens 2. In this manner, even after the two light beams are multiplexed and their propagation directions are matched by the blazed diffraction gratings 5a and 5b and the diffraction grating 6, the centers of curvature of the wavefronts of the two light beams remain matched with each other although a small positional shift is produced between the two light beams. More specifically, the centers of curvature of the wavefronts of the two multiplexed light beams do not shift independently of the value of the azimuth angle η of attachment errors, and no spatial interference fringes are formed on the light-receiving surface of the 4-split sensor 7.

Figure 6:
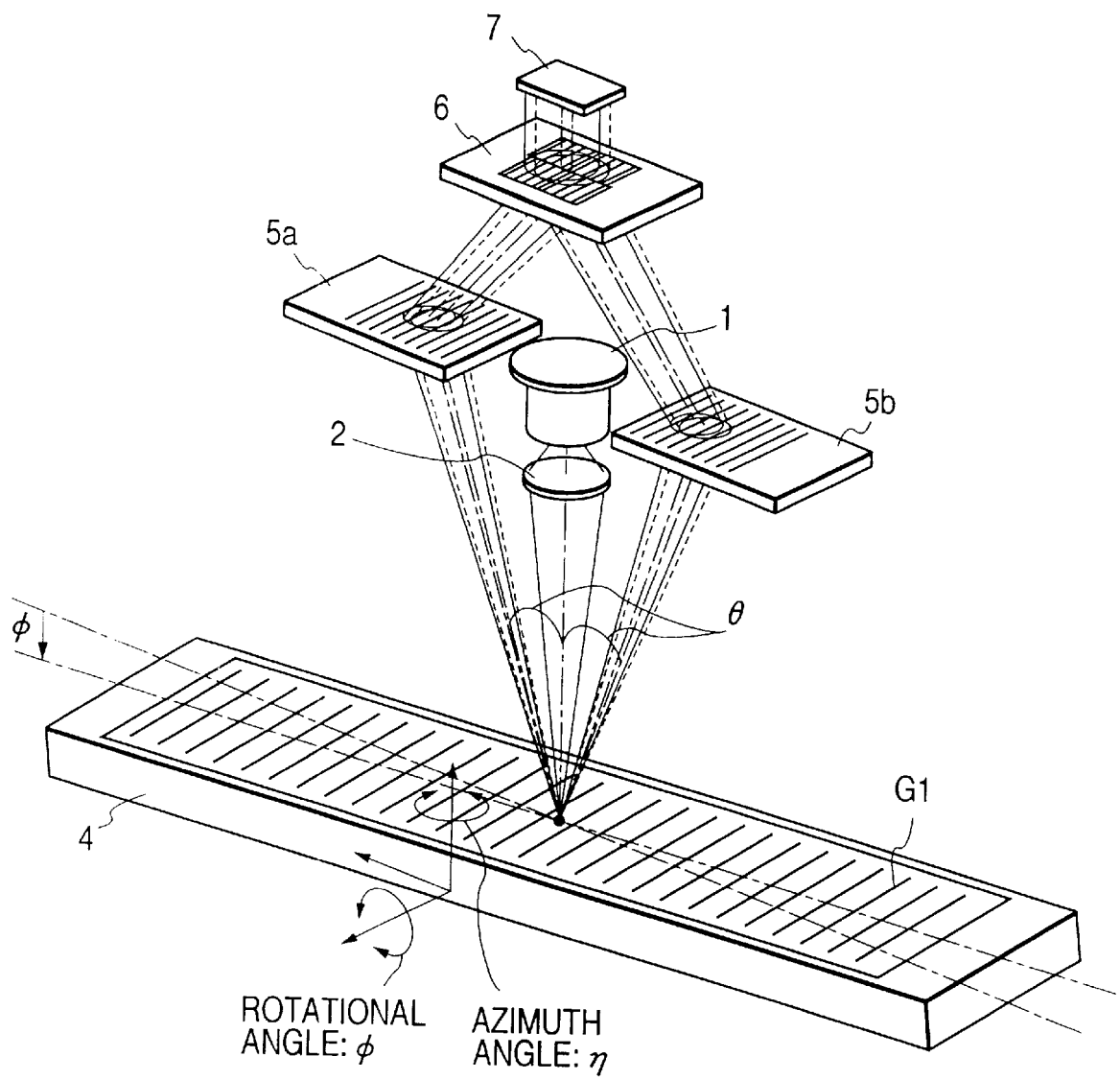
FIG. 6 is a perspective view showing the optical path when the scale is rotated in the rotational angle direction.

FIG. 6 shows the optical path when the scale 4 suffers attachment errors in the rotational angle direction.

As can be seen from FIG. 6, when the scale 4 suffers attachment errors of the rotational angle φ, ±first-order diffracted light beams respectively make different angles with the optical axis of the lens 3 (apparent diffraction angles). The apparent diffraction angle θ±2φ is obtained by:

$$p1(\sin\theta \pm \sin\phi) = \lambda$$

These ±first-order diffracted light beams with different apparent diffraction angles shift from a state in which the device is free from any attachment errors (dotted lines) in the rotational angle direction, and emerge from the diffraction grating as diverging beams.

The two divergent light beams continue to have wavefronts having the irradiation point on the diffraction grating as their centers of curvature independently of the rotational angle φ, since the diffraction grating G1 is adjusted for the beam focusing position of the lens 2. In this manner, even after the two light beams are multiplexed and their propagation directions are matched by the blazed diffraction gratings 5a and 5b and the diffraction grating 6, the centers of curvature of the wavefronts of the two light beams remain matched with each other, although a small positional shift is produced between the two light beams. More specifically, the centers of curvature of the wavefronts of the two multiplexed light beams do not shift independently of the value of the rotational angle φ of attachment errors, and no spatial interference fringes are formed on the light-receiving surface of the 4-split sensor 7.

With the above-mentioned arrangement, an optical displacement measurement apparatus that can be used regardless of the attachment precision of the scale can be provided.

Furthermore, as in the first embodiment, after the diffraction grating 6 of the second embodiment is constituted by a single grating, and the 4-split sensor 7 is replaced by a sensor with a single light-receiving surface, the positions of the set of the laser diode 1 and the collimator lens 2, and the sensor 7 may be reversed, thus also realizing an optical displacement measurement apparatus which can be used regardless of attachment precision of the scale.

In addition, in FIG. 4, parallel mirrors with opposing reflection surfaces may be arranged in place of the blazed diffraction gratings 5a and 5b. In this case, the diffraction grating G1 is set to have the same grating pitch as that of the diffraction grating 6. With this arrangement, the same optical system as in the above embodiment can be realized.

As described above, according to the above embodiments, even when the scale suffers relative attachment errors in the azimuth or rotational angle direction, the interference state is stable, and stable signals can always be obtained.

An example in which the present invention is applied to an information recording apparatus will be explained below.

Figure 7:
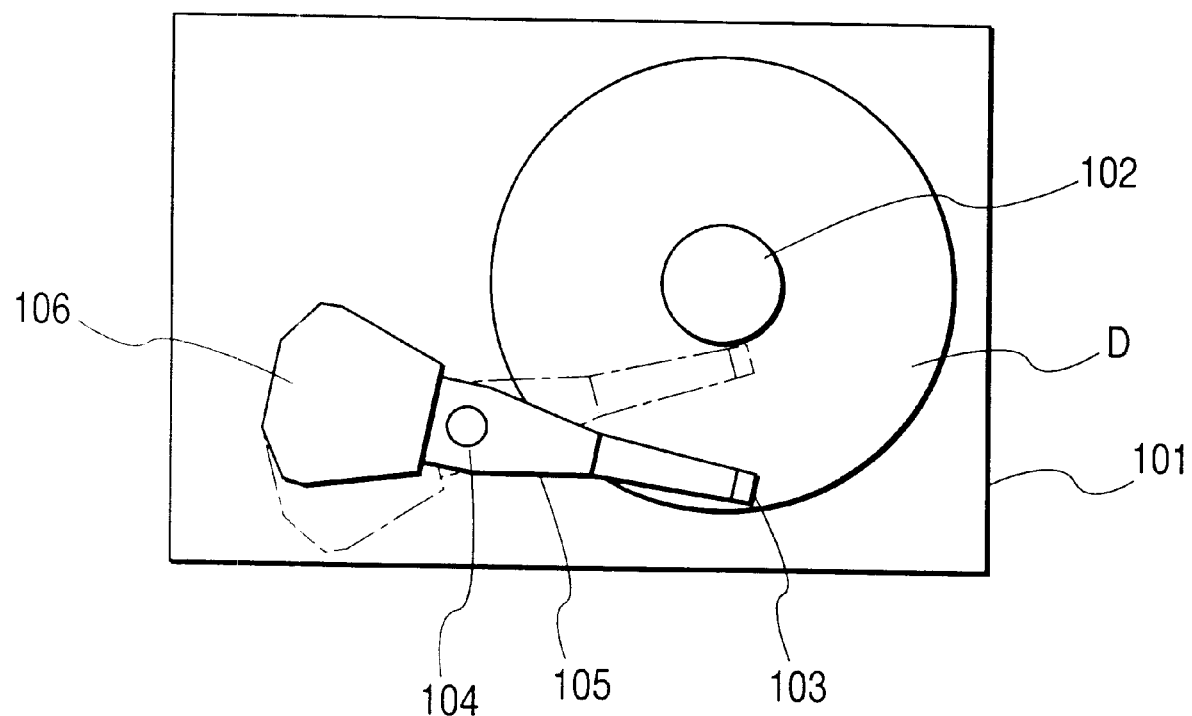
FIG. 7 is a plan view of a hard disk drive.

FIG. 7 is a plan view of a hard disk drive 101. A hard disk D has a surface on which a magnetic recording medium is deposited, and always rotates at high speed about a spindle 102. A magnetic head (not shown) built in a nearly rectangular slider 103 is arranged in the vicinity of the surface of the hard disk D. The slider 103 is attached to the distal end of a magnetic head arm 105, which has a rotation center 104 outside the hard disk D, and a voice coil 106 is fixed to the proximal end portion of the magnetic head arm 105.

In this arrangement, the magnetic head relatively moves above the hard disk D in substantially the radial direction, and a combination of the rotating hard disk D and the magnetic head that moves along an arcuated path can write magnetic information on a track at an arbitrary position on the surface of the hard disk D or can read magnetic information from a track at an arbitrary position.

The hard disk D is divided into a plurality of circular tracks with different radii, which tracks are concentric circles with respect to the rotation center 104, and each track is divided into a plurality of arcs. Magnetic recording on the hard disk D is attained by time-serially recording/reproducing information on/from a plurality of finally divided arcuated regions along the circumferential direction.

Embodiments to be described below will exemplify an apparatus for recording on such hard disk.

Figure 8:
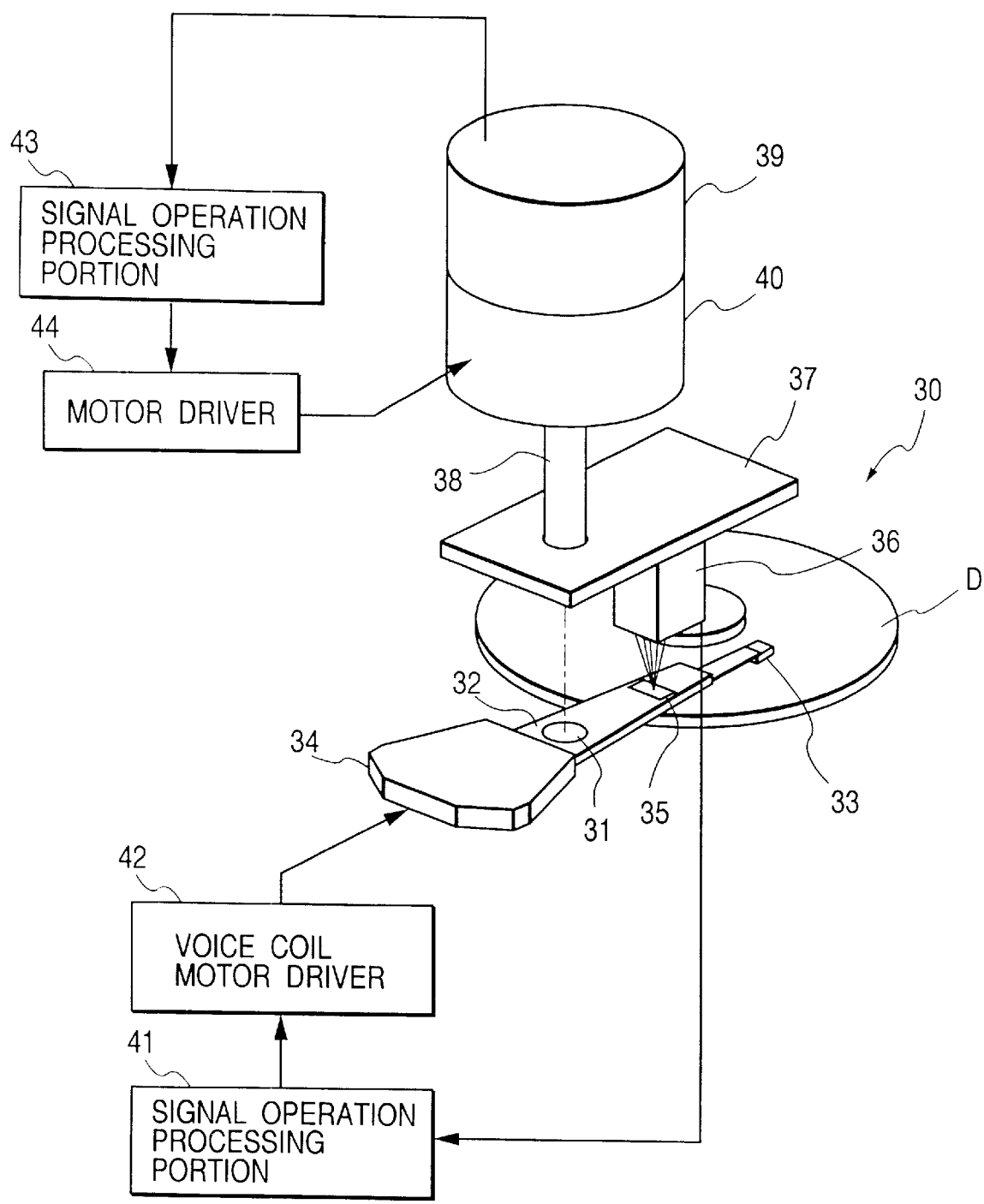
FIG. 8 is a perspective view of the third embodiment.

FIG. 8 is a perspective view of the third embodiment. In a hard disk drive 30, a magnetic head arm 32 having a rotation center 31 outside the hard disk D is attached, and a slider 33 is arranged on the distal end of the arm 32 to oppose the surface of the hard disk D with a gap of several μm or less. A magnetic head (not shown) is attached to the slider 33, and can record information on the hard disk D upon reception of a signal from a recording signal application circuit (not shown). A voice coil 34 is fixed to the proximal end portion of the magnetic head arm 32. When currents are supplied to the voice coil 34, the magnetic head arm 32 pivots, thereby moving the slider 33 above the hard disk D along an arcuated path.

A tape-like linear diffraction grating 35 is adhered onto the upper surface portion of the magnetic head arm 32, so that its grating arrangement direction nearly agrees with the rotation movement direction of the magnetic head arm 32. A spot-irradiated light beam is prevented from extending outside the grating effective portion of the diffraction grating 35 within the pivot range of about +15° of the magnetic head arm 32.

An optical non-contact displacement measurement sensor unit 36 is attached to an arm 37, and is inserted in a space above the upper surface of the hard disk drive 30. The arm 37 is supported by a rotation shaft 38 coaxial with the rotation center 31 of the magnetic head arm 32. A rotary positioner including a high-resolution rotary encoder 39 and a driving motor 40 is coupled to the rotation shaft 38. The sensor unit 36 pivots about the rotation shaft 38 by the driving motor 40, and its rotational position is measured by the rotary encoder 39. Using the signal output from the rotary encoder 39, high-precision rotational position alignment control can be accomplished.

The output from the sensor unit 36 is connected in turn to a signal operation processing portion 41, a voice coil motor driver 42, and the voice coil 34, and the output from the rotary encoder 39 is connected in turn to a signal operation processing portion 43, a motor driver 44, and the driving motor 40.

The sensor unit 36 irradiates a laser beam spot toward the linear diffraction grating 35, and ±first-order diffracted light beams return to the sensor unit 36, so that the distance of the magnetic head arm 32 with respect to the sensor unit 36 in the diffraction grating arrangement direction can be measured at a resolution of 0.01 μm or less. While magnetic head position alignment is performed based on this measurement result, the magnetic head in the slider 33 at the distal end of the magnetic head arm 32 records a servo track signal on the hard disk D.

Figure 9:
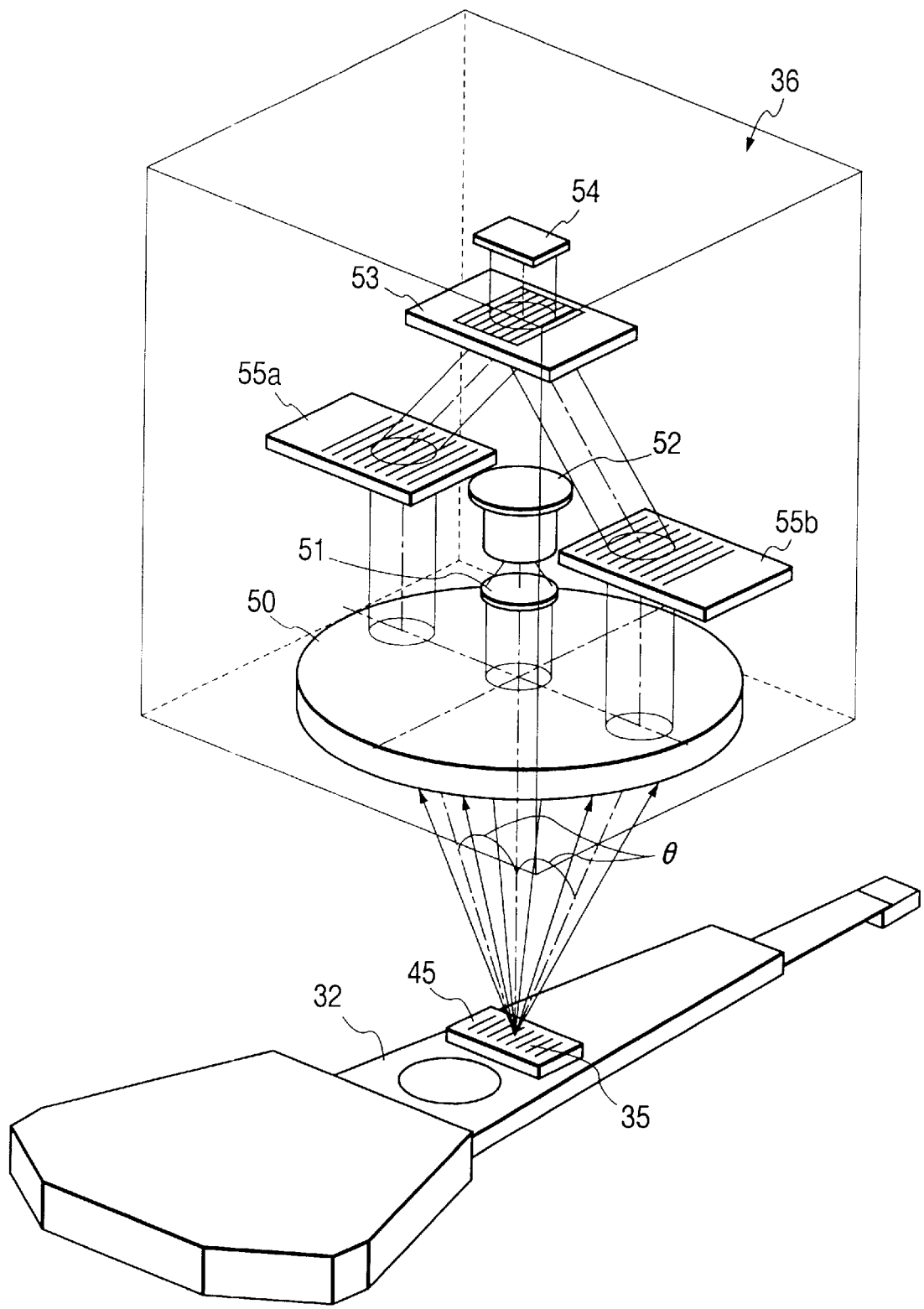
FIG. 9 is a perspective view of an optical sensor unit.

FIG. 9 is a perspective view of an optical system in the sensor unit 36. A scale 45 to which the linear diffraction grating 35 is adhered, is fixed on the upper surface of the magnetic head arm 32, and the sensor unit 36 is set above the diffraction grating 35. In the sensor unit 36, a lens 50 is arranged at a position where the distance from the diffraction grating 35 corresponds to a focal point position f, and a collimator lens 51 and a semiconductor laser light source 52 are arranged on the central optical axis of the lens 50. Above the light source 52, a diffraction grating 53 having four grating regions and a 4-split sensors 54 corresponding to these grating regions are arranged. Furthermore, equal-pitch blazed diffraction gratings 55a and 55b for deflecting light beams toward the optical axis direction of the entire optical system are arranged at positions above two end portions of the lens 50 that receives reflected light from the linear diffraction grating 35.

The diffraction grating 53 has the same pitch as those of the blazed diffraction gratings 55a and 55b, and has grating regions with grating phases shifted by $\lambda/4$ each in the two-light beam transmission region. Two light beams deflected by the blazed diffraction gratings 55a and 55b are multiplexed with their wavefronts being matched with each other, by the diffraction grating 53. Note that a deflection optical system which includes a prism system in place of the two blazed diffraction gratings 55a and 55b, and multiplexes two collimated light beams with their wavefronts being matched with each other may be used.

With this arrangement, when precise position alignment is performed in a non-contact manner, the sensor unit 36 is pivoted by a small angle using the external rotary encoder 39 and driving motor 40. The signal output from the rotary encoder 39 is input to the signal operation processing portion 43 to drive the motor driver 44, and the driving motor 40 performs high-precision rotational position alignment. The sensor unit 36 outputs a signal indicating that the distance to the magnetic head arm 32 or slider 33 has been changed.

When the magnetic head arm 32 pivots upon current supply to the voice coil 34, the sensor unit 36 outputs a signal indicating that the distance has changed again. This signal is input to the signal operation processing portion 41, and the voice coil 34 is driven by the voice coil motor driver 42. When it is determined that the magnetic head arm 32 has returned to the initial state, the distance between the sensor unit 36 and the head arm 32 becomes an original state. By repeating such operations at high speed, micro-movement and high-precision position alignment of the magnetic head arm 32 or slider 33 are attained in a non-contact manner in cooperation with micro-movement and high-precision position alignment of the sensor unit 36. Note that the actual position alignment procedure need not be intermittently performed as described above, and the magnetic head arm 32 can be moved to follow the movement of the sensor unit 36 in accordance with an optimal control theory so as to attain position alignment.

A divergent light beam emitted from the semiconductor laser light source 52 in the sensor unit 36 is converted into a collimated light beam by the collimator lens 51, and the collimated light beam is irradiated as a spot onto the diffraction grating 35 via the lens 50. The diffraction grating 35 has a phase diffraction grating which has a grating height substantially equal to the ¼ of the wavelength so as to especially strongly reflect and diffract ±first-order diffracted light beams especially strongly. If $\lambda$ represents the wavelength of a laser beam and $\alpha$ represents the diameter of the laser collimated light beam, a beam waist $\omega$ on the diffraction grating is given by $\omega=1.273\times\lambda\times|f|/\alpha$. The diameter $\alpha$ of the laser collimated light beam and the focal point position f are selected with respect to the grating pitch p of the diffraction grating 35, so that the beam waist $\omega$ corresponds to several grating lines or more.

The light beam irradiated onto the diffraction grating 35 is reflected and diffracted to output ±first-order diffracted light. The diffraction angle $\theta$ of the ±first-order diffracted light at that time is obtained from the following equation:

$$p \cdot \sin \theta = \lambda$$

The ±first-order diffracted light is transmitted through the lens 50 again, and is converted into two collimated light beams having optical axes parallel to each other. With this optical system, even when the diffraction grating 35 has rotated along the grating formation surface, both ±first-order diffracted light beams obtained by the diffraction grating 35 are always collimated light beams and their optical axes are parallel to each other. The two collimated light beams are deflected by the equal-pitch blazed diffraction gratings 55a and 55b, and are multiplexed with their wavefronts being matched with each other, by the diffraction grating 53 having the four grating regions. In this manner, the 4-split sensor 54 outputs four sine wave signals with phase differences of a ¼ period upon movement of the diffraction grating 35.

As described above, since the two blazed diffraction gratings 55a and 55b are arranged in the deflection optical system that multiplexes two collimated light beams with their wavefronts being matched with each other, and different grating arrangement phase portions are formed in the light beam transmission region of each of these two blazed diffraction gratings 55a and 55b, phase shift signals can be detected without using any complicated optical arrangement such as a combination of a quarter-wave plate and a deflection prism, thus realizing high-precision detection with a simple arrangement.

Assume that the grating pitch of the diffraction grating 35 is set at p=1.6 μm. In this case, when a light beam moves by 0.8 μm on the grating portion, the density (light and dark) pattern sinusoidally changes by one period. When the changes in density pattern are converted into electrical signals by, e.g., a photoelectric conversion element to obtain sine wave signals having phase differences of a ¼ period, a known electrical circuit can stably divide the sine wave signals corresponding to displacement information into several hundred phases. For example, if the electrical circuit can divide the sine wave signals into 400 (800) phases, displacement information can be detected at a resolution of about 0.002 (0.001) μm.

Figure 10:
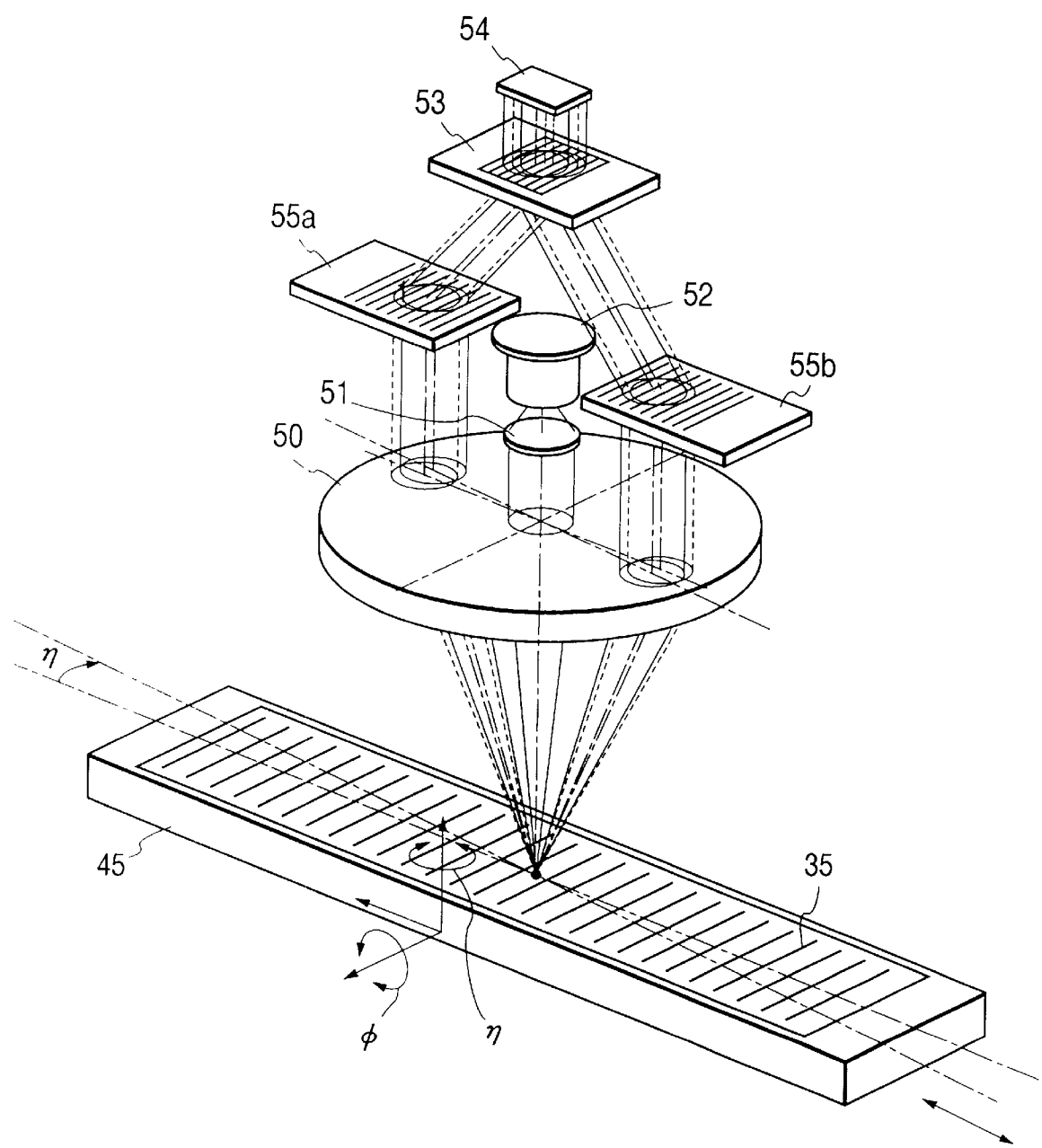
FIG. 10 is a perspective view of the optical path when deviations in the azimuth angle direction have occurred.

FIG. 10 shows the optical path when the diffraction grating 35 suffers errors in the azimuth angle direction. If the diffraction grating 35 has rotated by an azimuth angle $\eta$, ±first-order diffracted light beams are diffracted while diverging in the direction of the azimuth angle $\eta$, to have the beam waist $\omega$ on the diffraction grating 35. These two divergent light beams are deflected when they are transmitted through the lens 50. In this case, since the focal point position f of the lens 50 is adjusted for the diffraction grating 35, the two divergent light beams become two light beams having parallel optical axes independently of the azimuth angle $\eta$.

Figure 11:
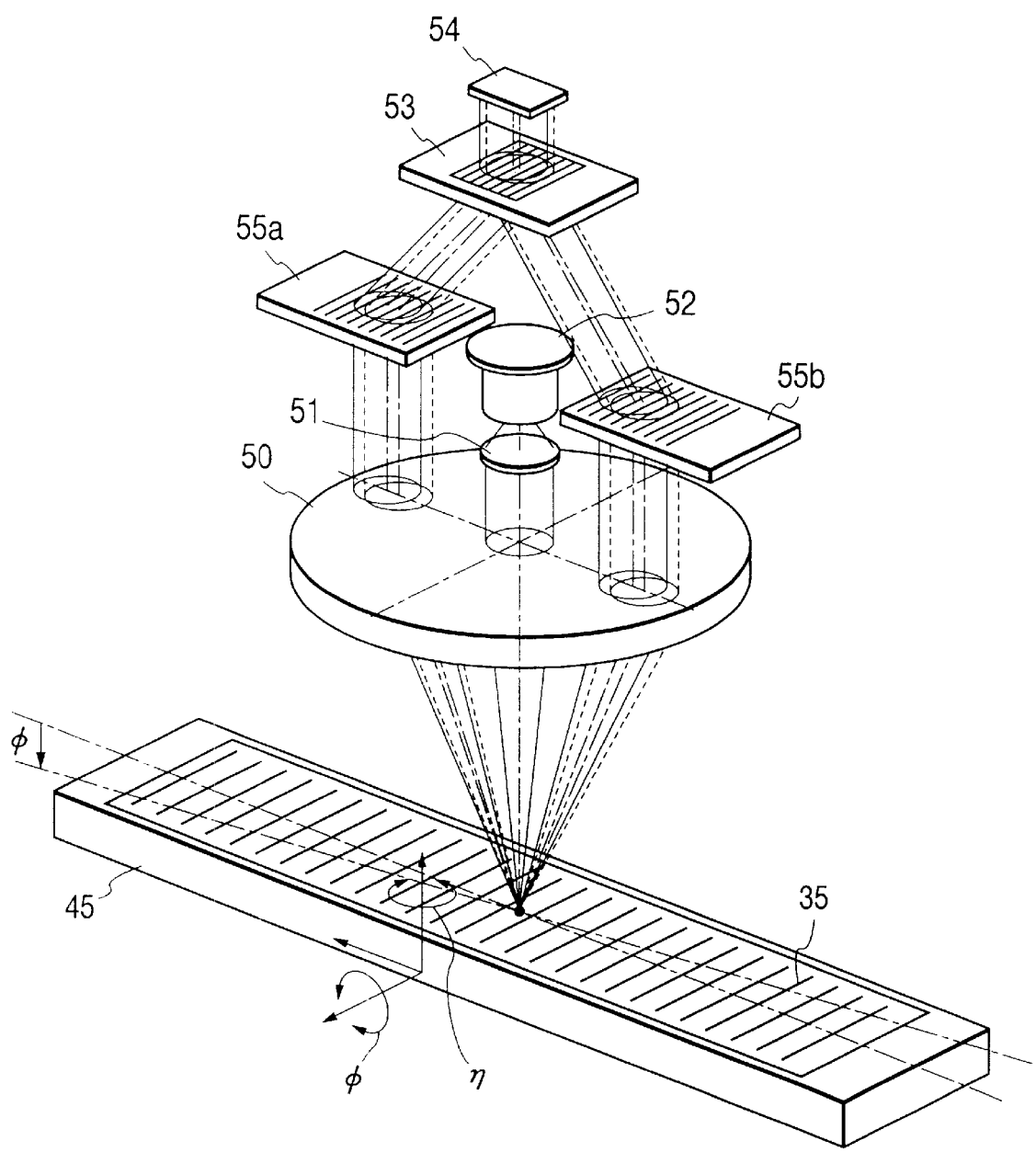
FIG. 11 is a perspective view of the optical path when deviations in the rotational angle direction have occurred.

FIG. 11 shows the optical path when the diffraction grating 35 suffers errors in the rotational angle direction. If the diffraction grating 35 has rotated by a rotational angle φ in the rotational angle direction, the diffraction angles θ the ±first-order diffracted light beams make with the optical axis are obtained using:

$$p \cdot (\sin \theta \pm \sin \phi) = \lambda$$

These ±first-order diffracted light beams making different diffraction angles θ with the optical axis are diffracted while diverging to have the beam waist ω on the diffraction grating. When the two divergent light beams are transmitted through the lens 50 similarly to the case of errors in the azimuth angle direction, they are converted into collimated light beams independently of the rotational angle φ.

As described above, when the diffraction grating 35 suffers attachment errors, since interference of light is always maintained in a satisfactory state although the optical paths of light beams are slightly shifted, the diameter of the incident light beam, grating pitch, and the focal length of the lens 50 are selected in correspondence with expected attachment errors of the diffraction grating 35 so that the two light beams can finally reach the 4-split sensor 54, thus always stably detecting displacement information.

In this manner, the sensor unit 36 which is optimal for indirectly aligning the magnetic head arm 32 with high precision in a non-contact manner can be realized.

Figure 12:
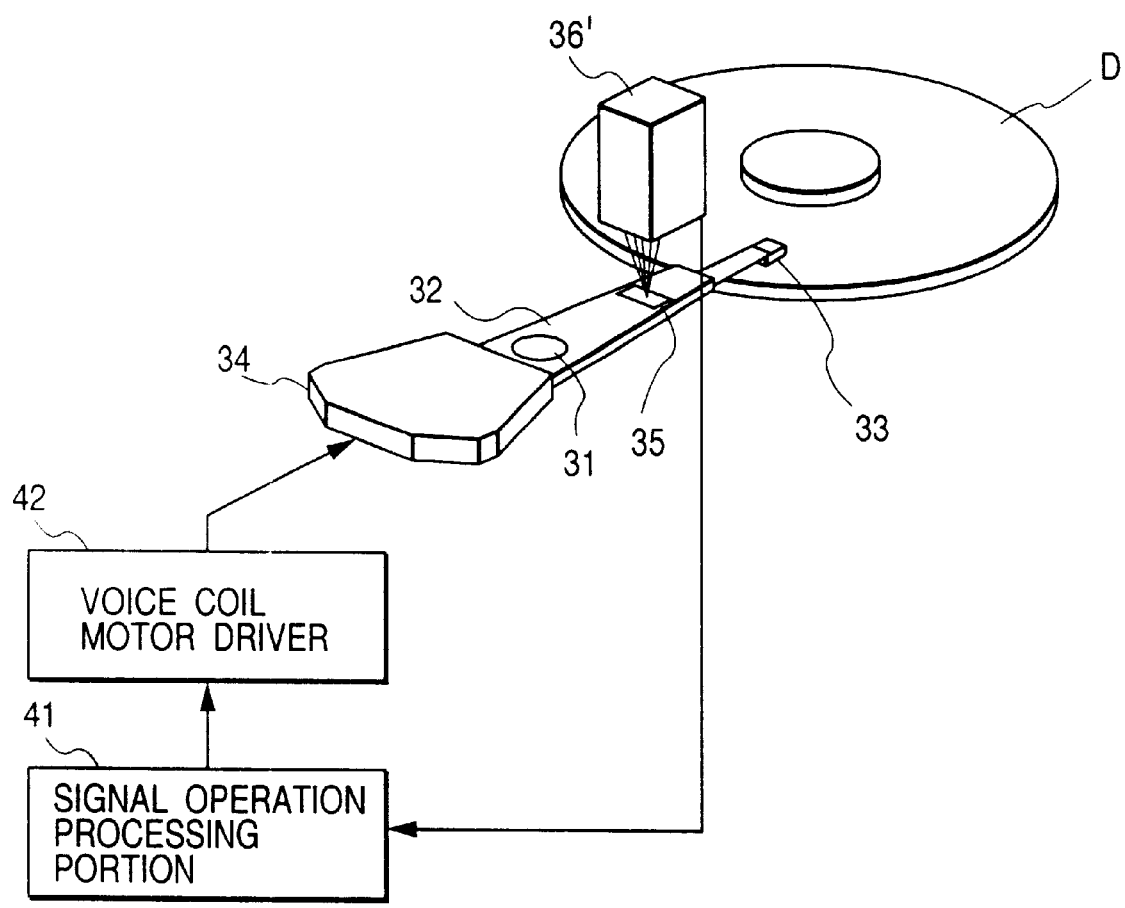
FIG. 12 is a perspective view of the fourth embodiment.

FIG. 12 is a perspective view of the fourth embodiment, and the same reference numerals in FIG. 12 denote the same parts as in the third embodiment. In the fourth embodiment, a sensor unit 36' is fixed in position above the diffraction grating 35 on the magnetic head arm 32 to measure the displacement information of the magnetic head arm 32, and to directly control the position of the magnetic head arm 32, so as to write a servo track signal. The diffraction grating 35 does not fall outside the light beam range from the sensor unit 36' even when the magnetic head arm 32 is moved.

Figure 13:
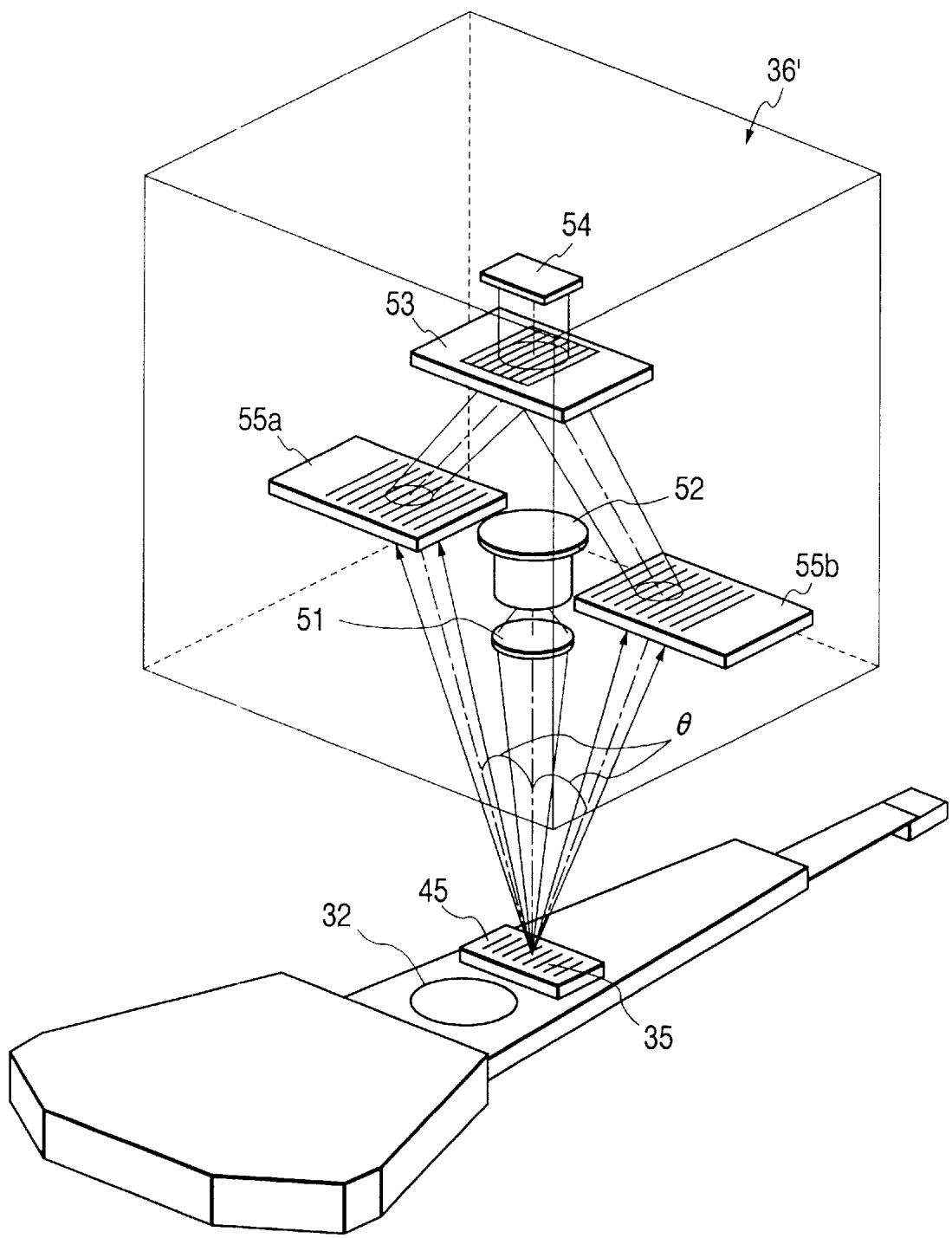
FIG. 13 is a perspective view of an optical sensor unit.

FIG. 13 is a perspective view of an optical system in the sensor unit 36'. In FIG. 13, a laser beam is directly irradiated as a spot from the collimator lens 51 onto the linear diffraction grating 35 without using the lens 50 shown in FIG. 9. In this case, since the beam waist ω on the diffraction grating 35 is determined by a projection optical system, the number of grating lines to be irradiated with respect to the grating pitch p of the diffraction grating 35 can be set independently of the lens 50. Note that other aspects of this embodiment are the same as those in the third embodiment, and a detailed description thereof will be omitted.

A divergent light beam emitted from the semiconductor laser light source 52 is converted by the collimator lens 51 into a convergent light beam which has the beam waist ω on the diffraction grating 35, and the convergent light beam is irradiated onto the diffraction grating 35. The light beam is reflected and diffracted to output ±first-order diffracted light beams. At this time, the diffraction angles θ the ±first-order diffracted light beams make with the optical axis are obtained from the following equation as in the third embodiment:

$$P1 \cdot \sin \theta = \lambda$$

where P1 is the grating pitch of the diffraction grating 35.

The ±first-order diffracted light beams are deflected by the blazed diffraction gratings 55a and 55b which are arranged to deflect light beams toward the optical axis direction of the entire optical system and have a grating pitch P2, and are multiplexed with their wavefronts being matched with each other, by the diffraction grating 53 which has a grating pitch P3 and has four grating regions with grating phases shifted by λ/4 each within a two-light beam transmission region. Then, the 4-split sensor 54 corresponding to the four grating regions outputs sine wave signals with phase differences of a ¼ period upon movement of the diffraction grating 35. Note that the grating pitches P1, P2, and P3 of the three diffraction gratings 35, 55a (55b), and 53, satisfy:

$$1/P2 = 1/P1 + 1/P3$$

In this manner, when the diffraction grating interval is set so that the diffraction grating 53 adjusts the optical axes of two diffracted light beams, a deflection optical system that can finally multiplex two diffracted light beams with their wavefronts matched with each other, can be realized.

Figure 14:
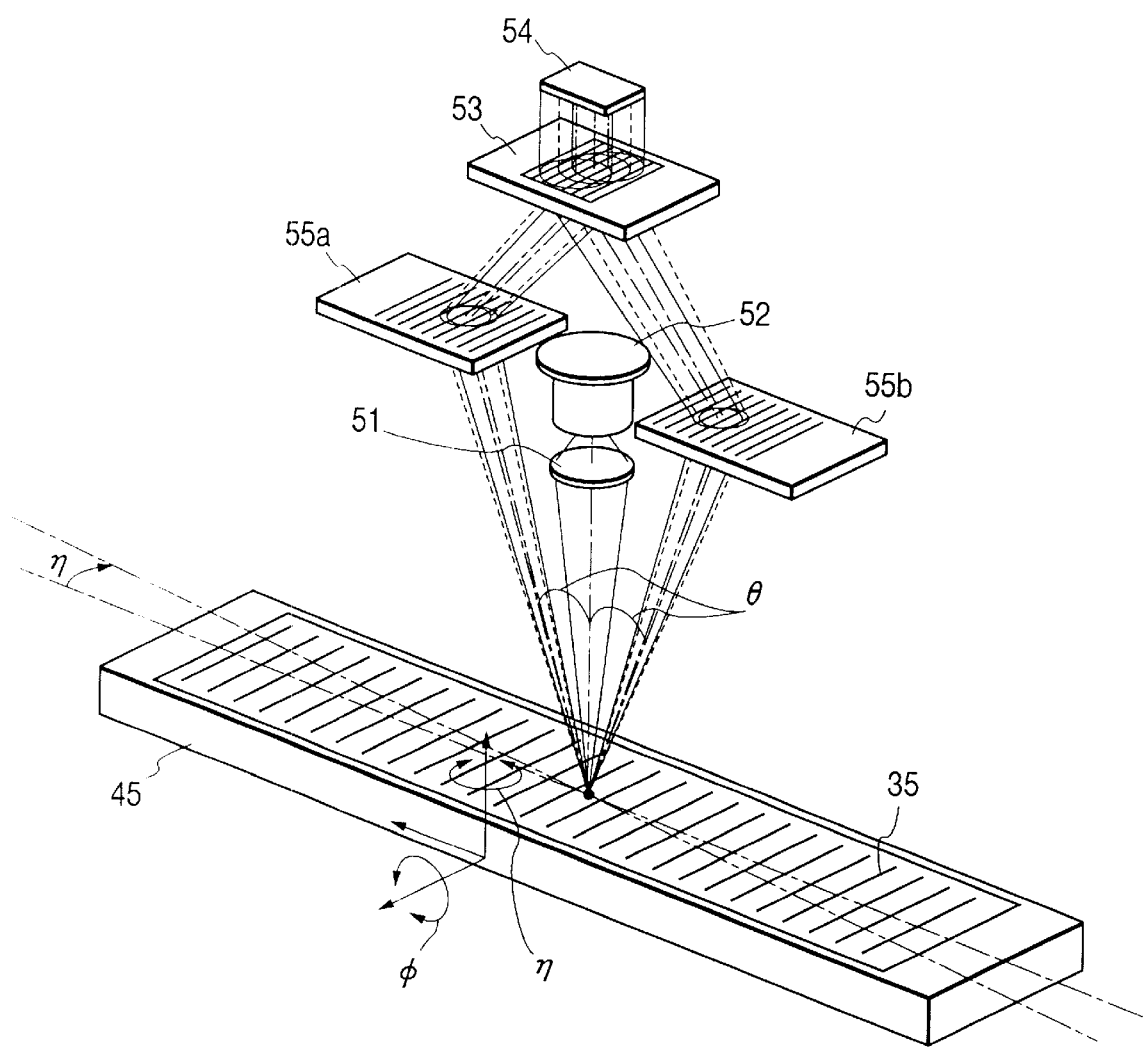
FIG. 14 is a perspective view of the optical path when errors in the azimuth angle direction have occurred.

FIG. 14 shows the optical path when errors in the azimuth angle direction have occurred. When the scale 45 has been rotated by an azimuth angle η in the azimuth angle direction, ±first-order diffracted light beams are diffracted while diverging in the direction of the azimuth angle η to have the beam waist ω on the diffraction grating 35. These two divergent light beams are formed by wavefronts having the irradiated point on the diffraction grating 35 as their centers of curvature independently of the azimuth angle η, and their wavefronts match those of light beams obtained when the azimuth angle η is zero.

Figure 15:
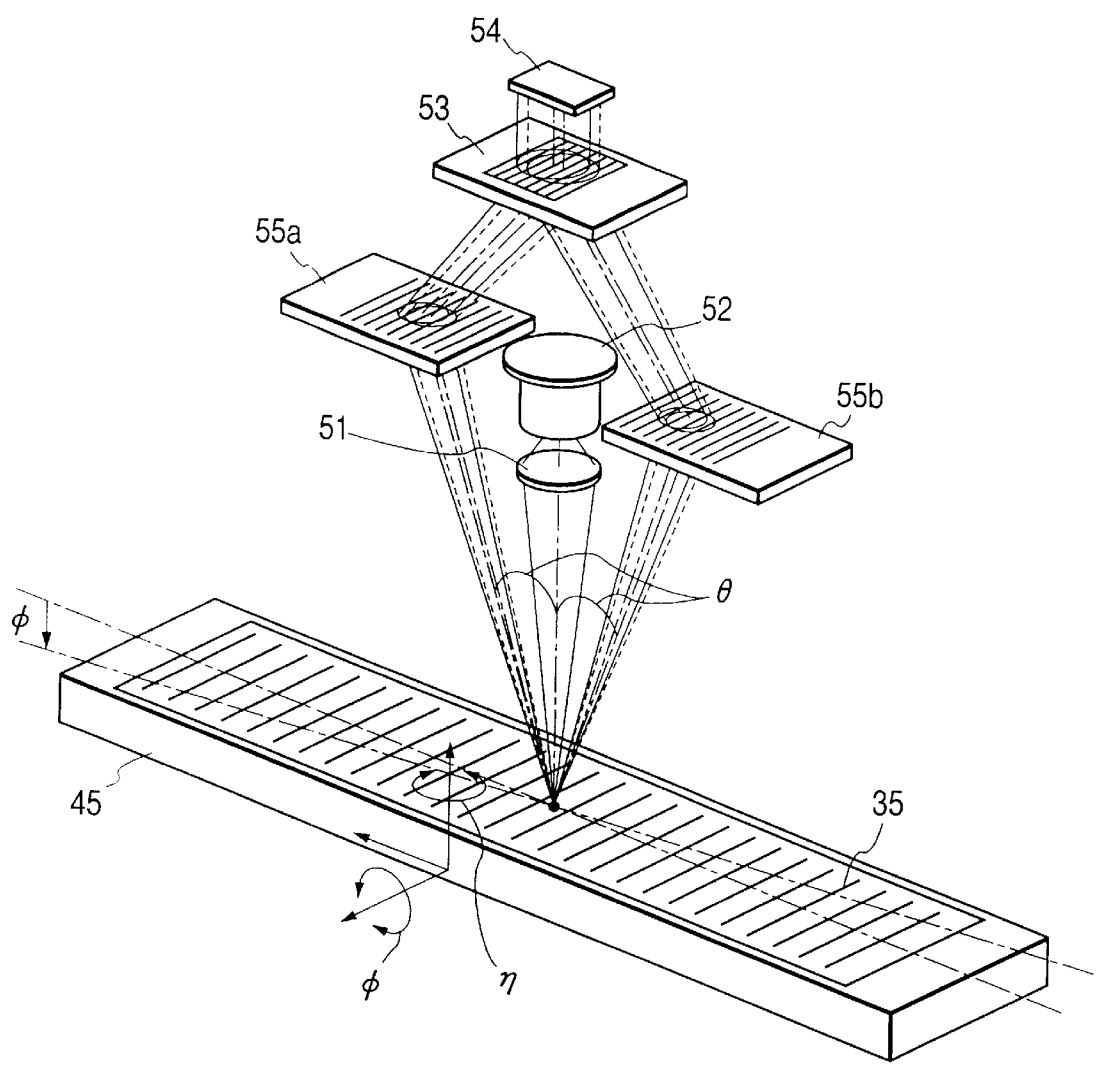
FIG. 15 is a perspective view of the optical path when errors in the rotational angle direction have occurred.

FIG. 15 shows the optical path when errors in the rotational angle direction have occurred. In this case as well, when the scale 45 has rotated by a rotational angle φ, the diffraction angles θ the ±first-order diffracted light beams make with the optical axis are obtained by the following equation:

$$P1 \cdot (\sine \theta \pm \sin \phi) = \lambda$$

The ±first-order diffracted light beams making different diffraction angles with the optical axis are diffracted while diverging to have the beam waist ω on the diffraction grating 35, and the two divergent light beams become light beams whose wavefronts match those of light beams obtained when the rotational angle φ is zero, independently of the rotational angle φ.

As described above, when the diffraction grating 35 suffers attachment errors, since interference of light is always maintained in a satisfactory state although the optical paths of light beams shift slightly, the diameter of the incident light beam, grating pitch, and the focal length of the lens 50 are selected in correspondence with the pivot driving range of about ±15° of the magnetic head arm 32 and expected attachment errors of the diffraction grating 35 so that the two light beams can finally reach the 4-split sensor 54, thus always stably detecting displacement information. In this manner, a sensor unit 36' which is optimal for directly aligning the magnetic head arm 32 and, hence, the slider 33, with high precision in a non-contact manner can be realized.

Figure 16:
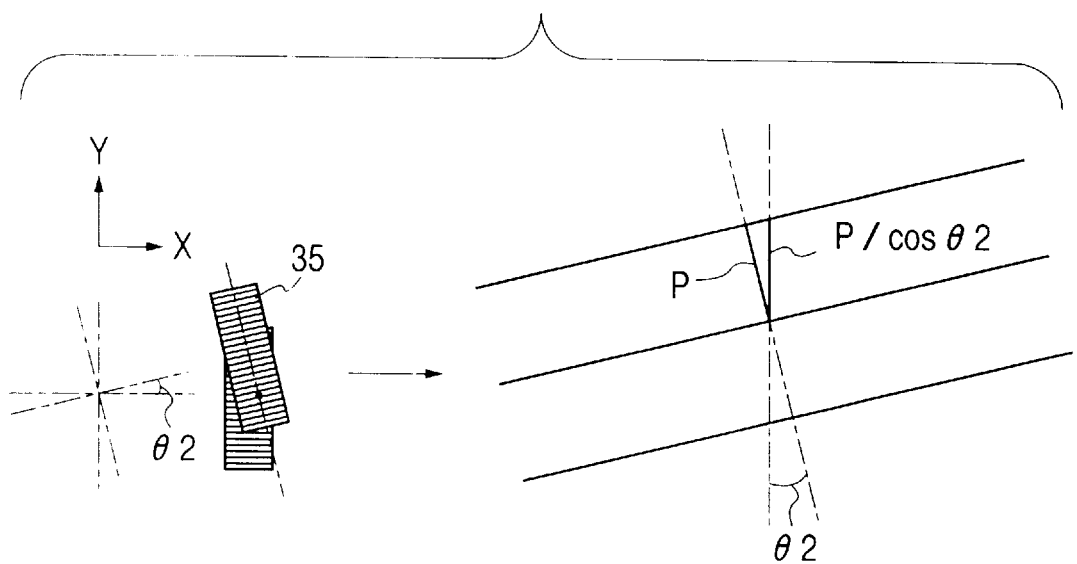
FIG. 16 is an explanatory view of the relationship between the detection signal and slider moving amount.
Figure 17:
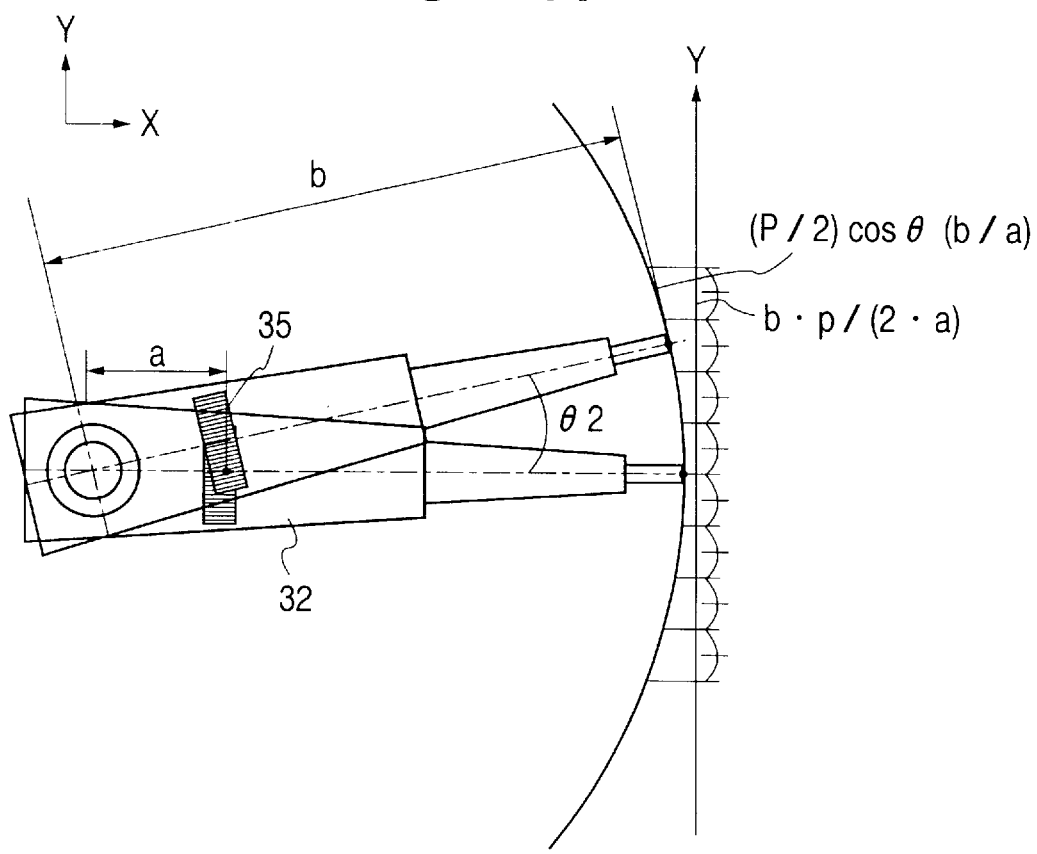
FIG. 17 is an explanatory view of the relationship between the detection signal and slider moving amount.

FIGS. 16 and 17 are explanatory views of the relationship between the detection signal and the moving amount of the slider 33. Note that the X-axis is a line connecting the rotation center of the magnetic head arm 32 and the beam irradiation point of the sensor unit 36', and the Y-axis is a direction perpendicular to the X-axis. The diffraction grating 35 uses a linear diffraction grating on which grating lines are arranged in a direction perpendicular to a line connecting the rotation center of the magnetic head arm 32 and the slider 33. Furthermore, a represents the interval between the rotation center of the magnetic head arm 32 and the beam irradiation point of the sensor unit 36', and b represents the interval between the rotation center of the magnetic head arm 32 and the slider 33.

A case will be examined below wherein the position of the slider 33 has rotated by θ2. From FIG. 16, since the grating spacing of the diffraction grating 35 in the Y-axis direction is p/cos θ2, the sensor unit 36' outputs sine wave signals for one period every time the magnetic head arm 32 has moved by (p/2)cos θ2 in the Y-axis direction at the beam irradiation point of the sensor unit 36'. On the other hand, in FIG. 17, the slider 33 moves at a ratio of b/a with respect to the beam irradiation point moving amount of the sensor unit 36', and if the moving amount of the slider 33 is projected onto the Y-axis, the slider 33 moves at a ratio of (p/2)·cos θ2(b/a) with respect to the beam irradiation point moving amount of the sensor unit 36'.

Hence, the moving amount L, in the Y-axis direction, of the slider 33 per sine wave of the sensor unit 36' is given by:

$$L=(p/2)\cdot\cos\theta 2\cdot(b/a)/\cos\theta 2=b\cdot p/(2\cdot a)$$

The moving amount L is constant independently of the rotational position of the magnetic head arm 32.

At this time, since the grating pitch of the diffraction grating 35 is independent from the radial direction, adhesion errors of the diffraction grating 35 in the X-axis direction can be ignored. On the other hand, when the diffraction grating 35 is adhered to have a rotational angle φ, the grating space of the diffraction grating 35 in the Y-axis direction is p/cos(θ2−φ). However, even if the rotational angle φ is as large as 1°, linearity errors are 1% or less, and the adhesion allowable value can be very large.

For example, if the grating pitch of the diffraction grating 35 is set at p=1.6μm, a=10 mm, and b=50 mm, L=4 μm is obtained. When the displacement output of the sensor unit 36' is divided by 800 numbers by the electrical circuit, the detection resolution of the moving amount L of the slider 33 in the Y-axis direction is 0.005 μm.

In this manner, using the linear diffraction grating 35, since the detection signal and the moving amount of the slider 33 maintain a linear relationship with respect to the Y-axis direction and high resolution can be assured, the position control means of the slider 33 is realized by a simple arrangement. Since the diffraction grating 35 can have a large adhesion allowable value, the adhesion work can be simplified, and the attachment time of the diffraction grating 35 to the magnetic head arm 32 can be greatly shortened.

In the above description, the third embodiment uses the optical sensor of FIG. 9, and the fourth embodiment uses the optical sensor of FIG. 13. However, these embodiments may use either of these optical sensors.

As described above, since displacement information can be detected without requiring strict attachment and positional alignment of the diffraction grating onto the magnetic head arm, the attachment time of the diffraction grating onto the magnetic head arm can be greatly shortened. Also, since the displacement information of the magnetic head arm can be detected independently of the attachment position and arcuated movement of the diffraction grating, high-precision, stable displacement information can be obtained.

What is claimed is:

1. An apparatus for optically measuring a relative displacement of an object with a diffraction grating, comprising:

a light projection system converging and protecting a light beam so as to form a beam spot onto the diffraction grating; and light detection means for receiving an interference light beam obtained by multiplexing diffracted light beams of different orders from a position where the beam spot is formed on the diffraction grating, said light detection means being arranged so as to detect the interference light generated from the diffracted light beams in a state in which wavefronts of the diffracted light beams are matched with each other, the relative displacement of the object being measured upon light reception of said light detection means.

2. An apparatus according to claim 1, further comprising an optical system for multiplexing the diffracted light beams of different orders from the position where the beam spot is formed in a divergent state or after converting the diffracted light beams into collimated light beams and guiding the multiplexed light beam toward said light detection means.

3. An apparatus according to claim 2, wherein said optical system has substantially two light beam deflection diffraction gratings in correspondence with optical paths of the diffracted light beams of different orders, and the diffracted light beams of different orders are multiplexed by the substantially two light beam deflection diffraction gratings.

4. An apparatus according to claim 3, wherein a plurality of grating portions having different grating arrangement phases are formed within a light beam transmission region of one of the substantially two light beam deflection diffraction gratings.

5. An apparatus for optically measuring a relative displacement of an object with a diffraction grating, comprising:

a light projection system for spot-projecting a light beam onto the diffraction grating; and light detection means for receiving an interference light beam obtained by multiplexing diffracted light beams of different orders from the spot projection position on the diffraction grating in a state in which wavefronts of the diffracted light beams are matched with each other, the relative displacement of the object being measured upon light reception of said light detection means, wherein said light projection system has a lens system which is arranged so that a focal point position thereof is substantially located at a position of the diffraction grating, a collimated light beam is irradiated onto said lens system, and an optical system converts the diffracted light beams of different orders from the diffraction grating by said lens system into collimated light beams which are parallel to each other.

6. An apparatus for optically measuring a relative displacement of an object with a diffraction grating, comprising:

a light projection system converging and projecting a light beam so as to form a beam spot of the light beam onto the diffraction grating; and light detection means for receiving an interference light beam obtained by multiplexing diffracted light beams of different orders from a position where the beam spot is formed on the diffraction grating, said light detection means being arranged so as to detect the interference light generated from the diffracted light beams multiplexed in a state in which the diffracted light beams are collimated beams and are parallel to each other or in a state in which wavefronts of the diffracted light beams of different orders have an identical center of curvature, the relative displacement of the object being measured upon light reception of said light detection means.

7. An apparatus according to claim 6, further comprising an optical system for multiplexing the diffracted light beams of different orders from the position where the beam spot is formed in a divergent state or after converting the diffracted light beams into collimated light beams, and guiding the multiplexed light beam toward said light detection means.

8. An apparatus according to claim 7, wherein said optical system has substantially two light beam deflection diffraction gratings in correspondence with optical paths of the diffracted light beams of different orders, and the diffracted light beams of different orders are multiplexed by the substantially two light beam deflection diffraction gratings.

9. An apparatus according to claim 8, wherein a plurality of grating portions having different grating arrangement phases are formed within a light beam transmission region of one of the substantially two light beam deflection diffraction gratings.

10. An apparatus for optically measuring a relative displacement of an object with a diffraction grating, comprising:
a light projection system for spot-projecting a light beam onto the diffraction grating; and
light detection means for receiving an interference light beam obtained by multiplexing diffracted light beams of different orders from the spot projection position on the diffraction grating in a state in which the diffracted light beams are collimated beams and are parallel to each other or in a state in which wavefronts of the diffracted light beams of different orders have an identical center of curvature, the relative displacement of the object being measured upon light reception of said light detection means,
wherein said light projection system has a lens system which is arranged so that a focal point position thereof is substantially located at a position of the diffraction grating, a collimated light beam is irradiated onto said lens system, and an optical system converts the diffracted light beams of different orders from te diffraction grating by said lens system into collimated light beams which are parallel to each other.

11. An information recording apparatus for controlling a hard disk drive, which has a magnetic head arm and records on a hard disk by a magnetic head, to execute information recording on the hard disk, comprising:
a rotary member which has a rotation shaft substantially coaxial with a rotation center of the magnetic head arm;
a sensor unit which is arranged on a rotary member and measures a relative displacement between itself and the magnetic head arm, said sensor unit including
i) a light projection system converging and projecting a light beam so as to form a beam spot of the light beam onto the diffraction grating arranged on the magnetic head arm, and
ii) light detection means for receiving an interference light beam obtained by multiplexing diffracted light beams of different orders from a position where the beam spot is formed on the diffraction grating, said light detection means being arranged so as to detect the interference light generated from the diffracted light beams multiplexed in a state in which wavefronts of the diffracted light beams are matched with each other;
a servo control system for displacing the magnetic head arm in a direction to correct a relative displacement between the magnetic head arm and said sensor unit on a basis of a light detection result of said light detection means; and
a recording system for recording information on the hard disk by the magnetic head while controlling a rotational position of said rotary member.

12. An apparatus according to claim 11, further comprising an optical system for multiplexing the diffracted light beams of different orders from the position where the beam spot is formed in a divergent state or after converting the diffracted light beams into collimated light beams, and guiding the multiplexed light beam toward said light detection means.

13. An apparatus according to claim 12, wherein said optical system has substantially two light beam deflection diffraction gratings in correspondence with optical paths of the diffracted light beams of different orders, and the diffracted light beams of different orders are multiplexed by the substantially two light beam deflection diffraction gratings.

14. An apparatus according to claim 13, wherein a plurality of grating portions having different grating arrangement phases are formed within a light beam transmission region of one of the substantially two light beam deflection diffraction gratings.

15. An apparatus according to claim 11, wherein the diffraction grating comprises a linear type diffraction grating.

16. An apparatus according to claim 11, wherein said recording system records a servo track signal on the hard disk.

17. An information recording apparatus for controlling a hard disk drive, which has a magnetic head arm and records on a hard disk by a magnetic head, to execute information recording on the hard disk, comprising:
a rotary member which has a rotation shaft substantially coaxial with a rotation center of the magnetic head arm;
a sensor unit which is arranged on a rotary member and measures a relative displacement between itself and the magnetic head arm, said sensor unit including
i) a light projection system for spot-projecting a light beam onto a diffraction grating arranged on the magnetic head arm, and
ii) light detection means for receiving an interference light beam obtained by multiplexing diffracted light beams of different orders from the spot projection position on the diffraction grating in a state in which wavefronts of the diffracted light beams are matched with each other;
a servo control system for displacing the magnetic head arm in a direction to correct a relative displacement between the magnetic head arm and said sensor unit on a basis of a light detection result of said light detection means; and
a recording system for recording information on the hard disk by the magnetic head while controlling a rotational position of said rotary member,
wherein said light projection system has a lens system which is arranged so that a focal point position thereof is substantially located at a position of the diffraction grating, a collimated light beam is irradiated onto said lens system, and an optical system converts the diffracted light beams of different orders from the diffraction grating by said lens system into collimated light beams which are parallel to each other.

18. An information recording apparatus for controlling a hard disk drive, which has a magnetic head arm and records on a hard disk by a magnetic head, to execute information recording on the hard disk, comprising:
a sensor unit which is arranged on a rotary member and measures a relative displacement between itself and the magnetic head arm, said sensor unit including
i) a light projection system converging and projecting a light beam so as to form a beam spot of the light beam onto the diffraction grating arranged on the magnetic head arm, and ii) light detection means for receiving an interference light beam obtained by multiplexing diffracted light beams of different orders from a position where the beam spot is formed on the diffraction grating, said light detection means being arranged so as to detect the interference light generated from the diffracted light beams multiplexed in a state in which the diffracted light beams are collimated beams and are parallel to each other or in a state in which wavefronts of the diffracted light beams of different orders have an identical center of curvature; and a recording system for recording information on the hard disk by the magnetic head while controlling a rotational position of the magnetic head arm on the basis of a light detection result of said light detection means.

19. An apparatus according to claim 18, further comprising an optical system for multiplexing the diffracted light beams of different orders from the position where the beam spot is formed in a divergent state or after converting the diffracted light beams into collimated light beams, and guiding the multiplexed light beam toward said light detection means.

20. An apparatus according to claim 19, wherein said optical system has substantially two light beam deflection diffraction gratings in correspondence with optical paths of the diffracted light beams of different orders, and the diffracted light beams of different orders are multiplexed by the substantially two light beam deflection diffraction gratings.

21. An apparatus according to claim 20, wherein a plurality of grating portions having different grating arrangement phases are formed within a light beam transmission region of one of the substantially two light beam deflection diffraction gratings.

22. An apparatus according to claim 18, wherein said recording system records a servo track signal on the hard disk.

23. An apparatus according to claim 18, wherein the diffraction grating comprises a linear type diffraction grating.

24. An information recording apparatus for controlling a hard disk drive, which has a magnetic head arm and records on a hard disk by a magnetic head, to execute information recording on the hard disk, comprising:

a sensor unit which is arranged on a rotary member and measures a relative displacement between itself and the magnetic head arm, said sensor unit including i) a light projection system for spot-projecting a light beam onto a diffraction grating arranged on the magnetic head arm, and ii) light detection means for receiving an interference light beam obtained by multiplexing diffracted light beams of different orders from the spot projection position on the diffraction grating in a state in which the diffracted light beams are collimated beams and are parallel to each other or in a state in which wavefronts of the diffracted light beams of different orders have an identical center of curvature; and a recording system for recording information on the hard disk by the magnetic head while controlling a rotational position of the magnetic head arm on the basis of a light detection result of said light detection means, wherein said light projection system has a lens system which is arranged so that a focal point position thereof is substantially located at a position of the diffraction grating, a collimated light beam is irradiated onto said lens system, and an optical system converts the diffracted light beams of different orders from the diffraction grating by said lens system into collimated light beams which are parallel to each other.

* * * * *

UNITED STATES PATENT AND TRADEMARK OFFICE
CERTIFICATE OF CORRECTION

PATENT NO.   : 6,005,667
DATED        : December 21, 1999
INVENTOR(S)  : MAKOTO TAKAMIYA ET AL.

It is certified that error appears in the above-identified patent and that said Letters Patent is hereby corrected as shown below:

COLUMN 3:

Line 39, "the 1/4" should read --1/4--.

COLUMN 5:

Line 28, "beam" should read --beams--.

COLUMN 8:

Line, 20 "finally" should read --finely--.

COLUMN 9:

Line 16, "sensors 54" should read --sensor 54--.

COLUMN 10:

Line 1, "the 1/4" should read --1/4--; and
    Line 2, "especially strongly" should be deleted.

COLUMN 11:

Line 22, close up right margin;
    Line 23, close up left margin; and
    Line 66, "grating 53" should read --grating 53,--.

COLUMN 12:

Line 13, "finally" should read --finely--.

UNITED STATES PATENT AND TRADEMARK OFFICE
CERTIFICATE OF CORRECTION

PATENT NO. : 6,005,667
DATED : December 21, 1999
INVENTOR(S) : MAKOTO TAKAMIYA ET AL.

It is certified that error appears in the above-identified patent and that said Letters Patent is hereby corrected as shown below:

COLUMN 13:

Line 24, "space" should read --spacing--; and
    Line 62, "protecting" should read --projecting--.

COLUMN 15:

Line 34, "te" should read --the--.

Signed and Sealed this

Twenty-fourth Day of April, 2001

*Attest:*

NICHOLAS P. GODICI

*Attesting Officer*    Acting Director of the United States Patent and Trademark Office